(12) United States Patent
Mossoba et al.

(10) Patent No.: US 11,238,486 B2
(45) Date of Patent: Feb. 1, 2022

(54) MULTI-CUSTOMER OFFER

(71) Applicant: Capital One Services, LLC, McLean, VA (US)

(72) Inventors: Michael Mossoba, Arlington, VA (US); Tyler Maiman, Melville, NY (US); Ljubica Chatman, New York, NY (US); Joshua Edwards, Philadelphia, PA (US); Abdelkader M'Hamed Benkreira, New York, NY (US)

(73) Assignee: Capital One Services, LLC, McLean, VA (US)

( * ) Notice: Subject to any disclaimer, the term of this patent is extended or adjusted under 35 U.S.C. 154(b) by 107 days.

(21) Appl. No.: 16/776,004

(22) Filed: Jan. 29, 2020

(65) Prior Publication Data

US 2021/0233106 A1 Jul. 29, 2021

(51) Int. Cl.
| | |
|---|---|
| *G06N 5/02* | (2006.01) |
| *G06Q 30/02* | (2012.01) |
| *H04L 29/08* | (2006.01) |
| *G06F 9/54* | (2006.01) |
| *G06N 20/00* | (2019.01) |

(52) U.S. Cl.
CPC ........... *G06Q 30/0239* (2013.01); *G06F 9/54* (2013.01); *G06N 20/00* (2019.01); *H04L 67/26* (2013.01)

(58) Field of Classification Search
CPC ....... G06Q 30/0239; H04L 67/26; G06F 9/54; G06N 20/00
See application file for complete search history.

(56) References Cited

U.S. PATENT DOCUMENTS

| | | |
|---|---|---|
| 7,376,580 B1 | 5/2008 | Walker et al. |
| 7,945,585 B1 * | 5/2011 | Sorkin ............... G06Q 30/02 707/734 |
| 9,495,690 B2 | 11/2016 | Ovick et al. |
| 10,134,022 B1 | 11/2018 | Edwards et al. |
| (Continued) | | |

OTHER PUBLICATIONS

Membership Inference Attacks Against Machine Learning Models, Reza Shokripage 4, 2017 IEEE Symposium on Security and Privacy (Year: 2017).*

(Continued)

*Primary Examiner* — Abhishek Vyas
*Assistant Examiner* — Darnell A Pouncil
(74) *Attorney, Agent, or Firm* — Harrity & Harrity, LLP

(57) ABSTRACT

A device may determine a multi-customer offer, wherein the multi-customer offer identifies a threshold quantity of customers of the multi-customer offer to allow access to the multi-customer offer. The device may receive one or more requests to accept the multi-customer offer, wherein a request, of the one or more requests, is associated with a customer device of the one or more customer devices. The device may determine, based on a quantity of requests of the one or more requests, that the threshold quantity of customers is not satisfied. The device may identify, based on the threshold quantity of customers not being satisfied, one or more candidate customer devices having a likelihood of requesting to accept the multi-customer offer, wherein the one or more candidate customer devices are associated with respective users that are the potential customers, and wherein the likelihood satisfies a threshold.

20 Claims, 11 Drawing Sheets

(56) References Cited

U.S. PATENT DOCUMENTS

| | | | | |
|---|---|---|---|---|
| 2003/0093314 | A1* | 5/2003 | Leung | G06Q 30/02 |
| | | | | 705/14.13 |
| 2009/0099985 | A1* | 4/2009 | Tesauro | G06N 5/02 |
| | | | | 706/12 |
| 2013/0117080 | A1* | 5/2013 | Madsen | G06Q 30/0251 |
| | | | | 705/14.1 |
| 2020/0219055 | A1* | 7/2020 | Nagar | G06Q 30/0283 |

OTHER PUBLICATIONS

Kickstarter, "What is Kickstarter?" https://help.kickstarter.com/hc/en-us/articles/115004996453-What-is-Kickstarter—[Retrieved Aug. 16, 2019], 2 pages.

Kickstarter, "Why is funding all-or-nothing?" https://help.kickstarter.com/hc/en-us/articles/115005047893-Why-is-funding-all-or-nothing—[Retrieved Aug. 16, 2019], 2 pages.

Mobile Marketer, "JCPenney lets shoppers redeem mobile coupons at POS," https://www.mobilemarketer.com/ex/mobilemarketer/cms/news/commerce/4269.html [Retrieved Jan. 29, 2020], 4 pages.

Wikipedia, "Crowdfunding," In Wikipedia. https://en.wikipedia.org/wiki/Crowdfunding [Retrieved Aug. 16, 2019], 18 pages.

Wikipedia, "Group buying," https://en.wikipedia.org/wiki/Group_buying [Retrieved Aug. 16, 2019], 5 pages.

* cited by examiner

MULTI-CUSTOMER OFFER

BACKGROUND

Merchants may offer a variety of products or services for purchase by customers. The products or services may be associated with a cost per unit sold and a cost per batch (up to a certain quantity of units) sold. When a cost per batch is high relative to a cost per unit, it may not be beneficial to the merchant to offer particular products or services in small batches. In some instances, the merchant may lose money by selling the particular products or services in a small batch.

SUMMARY

According to some implementations, a method may include determining, by a device associated with a merchant, a multi-customer offer, wherein the multi-customer offer identifies a threshold quantity of customers of the multi-customer offer to allow access to the multi-customer offer; receiving, by the device and from one or more customer devices, one or more requests to accept the multi-customer offer, wherein a request, of the one or more requests, is associated with a customer device of the one or more customer devices; determining, by the device and based on a quantity of requests of the one or more requests, that the threshold quantity of customers is not satisfied; identifying, by the device and based on the threshold quantity of customers not being satisfied, one or more candidate customer devices using a machine learning model trained to identify potential customers having a likelihood of requesting to accept the multi-customer offer, wherein the one or more candidate customer devices are associated with respective users that are the potential customers, and wherein the likelihood satisfies a threshold; and providing, by the device, a notification of the multi-customer offer to the one or more candidate customer devices.

According to some implementations, a device may include one or more memories; and one or more processors, communicatively coupled to the one or more memories, configured to: determine a multi-customer offer, wherein the multi-customer offer identifies a threshold quantity of customers of the multi-customer offer to allow access to the multi-customer offer; receive, from a customer device, a request to accept the multi-customer offer; identify one or more candidate customer devices using a machine learning model trained to identify potential customers having a likelihood of requesting to accept the multi-customer offer, wherein the one or more candidate customer devices are associated with respective users that are the potential customers, and wherein the likelihood satisfies a threshold; and provide a notification of the multi-customer offer to the one or more candidate customer devices; receive, via at least one of the one or more candidate customer devices, one or more additional requests to accept the multi-customer offer; determine, based on the request and the one or more additional requests, that the threshold quantity of customers is satisfied; and allow access to the multi-customer offer based on the threshold quantity of customers being satisfied.

According to some implementations, a non-transitory computer-readable medium may store one or more instructions. The one or more instructions, when executed by one or more processors of a device, may cause the one or more processors to: determine a multi-customer offer, wherein the multi-customer offer identifies a threshold quantity of customers of the multi-customer offer to allow access to the multi-customer offer; receive, from one or more customer devices, one or more requests to accept the multi-customer offer, wherein a request, of the one or more requests, is associated with a customer device of the one or more customer devices; determine, based on a quantity of requests of the one or more requests, that the threshold quantity of customers is not satisfied; identify, based on the threshold quantity of customers not being satisfied, one or more candidate customer devices using a machine learning model trained to identify potential customers having a likelihood of requesting to accept of the multi-customer offer, wherein the one or more candidate customer devices are associated with respective users that are the potential customers; select one or more incentives for one or more of the potential customers; wherein an incentive, of the one or more incentives, is determined to increase a likelihood of a potential customer, of the potential customers, requesting to accept the multi-customer offer via a candidate customer device of the one or more candidate customer devices; and provide one or more notifications of the multi-customer offer to the one or more candidate customer devices, wherein the one or more notifications of the multi-customer offer identify the one or more incentives for the potential customers.

DETAILED DESCRIPTION

Figure 1A:
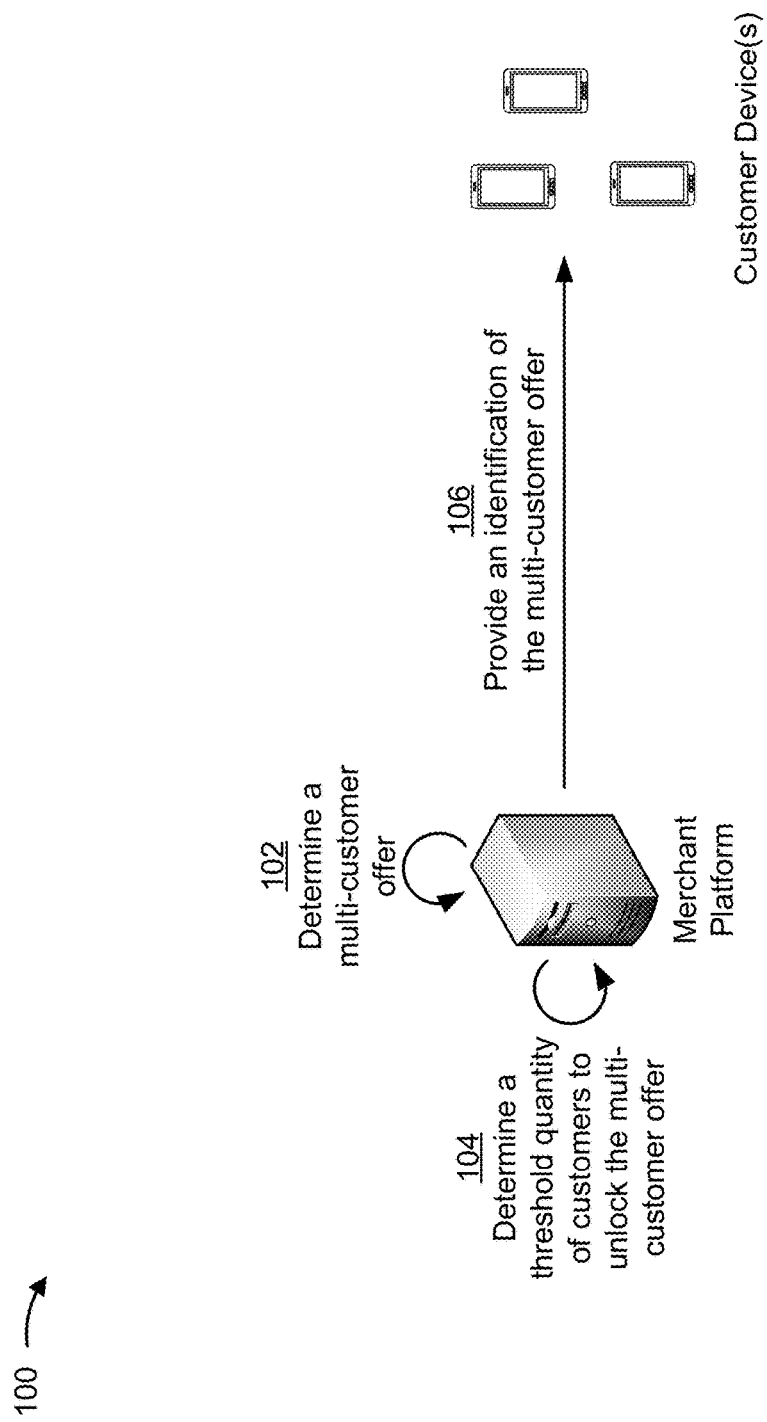
FIGS. 1A-1F are diagrams of one or more example implementations described herein.

The following detailed description of example implementations refers to the accompanying drawings. The same reference numbers in different drawings may identify the same or similar elements.

Some merchants may offer a variety of products to customers. However, some products or services may have a relatively high cost per batch. This may lead to the merchant being unprofitable when selling these products in small batches. To avoid unprofitability, the merchant may require a minimum quantity of purchasers to buy the products or services at a time so that a cost of a batch of the products or services can be shared by the purchasers. In this way, the merchant can attempt to increase a size of a batch to a threshold where the merchant is profitable.

When a group of customers satisfy a threshold quantity of customers and agree to purchase the product or service, the merchant may sequentially process payments from customers within the group. This means that the merchant may process payments of a first set of customers within the group before attempting to process payments of a second set of customers. If one or more of the second set of customers withdraw from purchasing the product or service before providing payment, or if a payment method fails, the threshold may no longer be satisfied. In this case, the merchant can allow the transaction to proceed for the first set of purchasers, at an unprofitable quantity of customers, or cancel the purchases of the one or more first customers. Canceling the purchases of the first set of customers can consume significant computing resources (e.g., processor resources, memory resources, communication resources, and/or the like).

Some implementations described herein involve a device that provides a multi-customer offer to one or more customer devices. The multi-customer offer is associated with a threshold quantity of customers that are needed to unlock the multi-customer offer (e.g., allow access to the multi-customer offer). The device may receive, from customer devices, requests to accept the multi-customer offer. If the quantity of customer devices requesting to accept the multi-customer offer satisfies the threshold quantity, the multi-customer offer may be accepted. However, if a payment defect is discovered, or if the quantity of customer devices requesting to accept the multi-customer offer does not satisfy the threshold quantity, the device may perform actions to attempt to avoid canceling or unwinding the purchases by the customers that have already requested to accept the multi-customer offer and have provided a valid payment method. These actions may conserve computing resources that would otherwise have been used to cancel the purchases by the customers that have provided a valid payment method.

The actions may include identifying potential customers associated with candidate customer devices. The device may identify the potential customers based on characteristics of the potential customers and/or the candidate customer devices based on the potential customers having a relatively high likelihood of requesting to accept the multi-customer offer, when compared with the general population. For example, the device may identify the potential customers based on proximity of the candidate customer devices to a physical location associated with a merchant that is associated with the multi-customer offer, association with the customers that have already requested to accept the multi-customer offer, association with demographics likely to request to accept the multi-customer offer, purchase history, registration for notifications, and/or the like. By identifying potential customers based on having a relatively high likelihood of requesting to accept the multi-customer offer, the device may conserve computing resources that might otherwise be used to provide a notification of the multi-customer offer to the general population. Additionally, identifying potential customers based on having a relatively high likelihood of requesting to accept the multi-customer offer may conserve computing resources that may otherwise be used to unwind or cancel payments associated with the requests to accept the multi-customer offer that the device has already received.

The device may also determine incentives to provide to the potential customers to increase a likelihood of the potential customers requesting to accept the multi-customer offer. The incentives may be the same for each of the potential customers. Alternatively, the incentives may be tailored for one or more of the potential customers based on characteristics of the one or more potential customers and/or an associated customer device.

The device can provide a notification of the multi-customer offer to the candidate customer devices. The notification may include additional information, such as an identification of an incentive, an indication of how many additional requests to accept the multi-customer offer are needed to unlock the multi-customer offer, an identification of the physical location associated with the merchant that is associated with the multi-customer offer, a deadline by which the multi-customer offer must be accepted, and/or the like.

Once a quantity of customers requesting to accept the multi-customer offer meets the threshold quantity, the device can allow access to the multi-customer offer to the requesting customer devices. Additionally, the device may provide a notification to other candidate customer devices to indicate that the multi-customer offer is available.

The techniques described herein may conserve computing resources that may otherwise have been used to cancel or unwind payments of customer devices based on failing to satisfy a threshold quantity of customers for a multi-customer offer. Additionally, the techniques described herein may conserve computing resources by intelligently identifying candidate customer devices and/or associated users to which the device can provide a notification instead of providing notifications to the general population. Further, the techniques described herein may include intelligently selecting incentives to provide to the candidate customer devices to increase a likelihood of receiving requests to accept the multi-customer offer, which may reduce a likelihood of failing to satisfy the threshold quantity of customers and which may result in canceling or unwinding payments of the customer devices that already provided a request to accept the multi-customer offer.

FIGS. 1A-1F are diagrams of an example implementation 100 described herein. As shown in FIGS. 1A-1F, the example implementation(s) 100 may include a merchant platform, one or more customer devices, and/or the like. The one or more customer devices may include a first customer device, one or more candidate customer devices, additional customer devices, and/or the like.

In some implementations, the merchant platform manages multi-customer offers for one or more physical locations associated with a merchant. The merchant platform may determine that a particular product or service is unprofitable when sold in small batches. In some implementations, the merchant platform may determine that selling the particular product or service in small batches is unprofitable by receiving information from another device, or from user input, indicating that the particular product or service has a cost per batch above a threshold amount, a cost per batch above a threshold percentage of a cost per unit, a minimum quantity of units per batch for profitability to satisfy a threshold, and/or the like.

In some implementations, a user of a customer device, of the one or more customer devices, may register an account with the merchant, the merchant platform, and/or the like. The account may be associated with the customer device and/or an account with another merchant that is accessible to the user of the customer device via the customer device. For example, the account may be associated with the customer device using a phone number or other device identifier, or via an application installed locally on the customer device. The account may be associated with an account of another merchant that is accessible via the customer device, such as an email address accessible via the customer device and through which the user can receive a communication from the merchant and/or the merchant platform. In some implementations, the customer may use the customer device to provide an authorization to receive push notifications, text messages, and/or other communications from the merchant, the merchant platform, and/or the like.

As shown in FIG. 1A, and by reference number 102, the merchant platform may determine a multi-customer offer. In some implementations, the merchant platform may determine the multi-customer offer by receiving instructions to generate the multi-customer offer from another device, user input, and/or the like.

The multi-customer offer may be associated with a product and/or service. In some implementations, the product and/or service is offered at a physical location associated with the merchant. The product may be a perishable product, such as food or drink, such that production of a batch that exceeds a quantity of purchased units may result in waste. The service may require supervision of one or more staff members of the merchant, such as a tour, use of a facility, and/or the like.

The multi-customer offer may be associated with an offer expiration period. In some implementations, after the multi-customer offer expiration period, the multi-customer offer is no longer available. In some implementations, after the multi-customer offer expiration period, requests to accept the multi-customer offer are rejected. The multi-customer offer may become available again after the multi-customer offer expiration period. For example, the multi-customer offer may become available again immediately or after a negligible amount of time, effectively resetting the multi-customer offer after the expiration period. In some implementations, the multi-customer offer may become available at regular intervals, during times based on a likelihood of satisfying the multi-customer offer, and/or the like.

In some implementations, the multi-customer offer may be offered during times determined to be associated with low patronage in an effort to drive a group of customers to a physical location associated with the merchant that is associated with the multi-customer offer. In some implementations, the multi-customer offer may be determined (e.g., using a machine learning process) based on determining that the multi-customer offer will likely cause an increase in a quantity of users visiting, and/or purchasing from, a physical location associated with the merchant that is associated with the multi-customer offer.

As shown by reference number 104, the merchant platform may determine a threshold quantity of customers to unlock (e.g., allow access to) the multi-customer offer. In some implementations, the merchant platform may determine the threshold quantity of customers based on instructions received via another device, a user input, and/or the like. In some implementations, the merchant platform may determine the threshold quantity of customers based on a quantity of customers that would provide a profit per batch that satisfies a profit per batch threshold, a quantity of customers that would provide a profit per unit that satisfies a profit per unit threshold, and/or the like.

In some implementations, the merchant platform may determine a maximum quantity of customers that may accept the multi-customer offer. For example, if a batch size is limited, the maximum quantity of customers may correspond to a quantity of units that may be available in a batch. In some implementations, once the maximum quantity of customers is reached, the multi-customer offer is no longer available for additional customer devices to accept. If the multi-customer offer is no longer available for additional customers to accept, the merchant platform may generate a new multi-customer offer for a same product or service. If additional requests to accept the new multi-customer offer from additional customer devices satisfy the threshold quantity of customers, the merchant platform may allow access to new multi-customer offer to the additional customer devices.

In some implementations, the multi-customer offer may include a product or service that is unavailable for purchase unless the threshold quantity of customers is satisfied. In some implementations, the multi-customer offer may define a discount and/or coupon, for buying the product or service, that is available to customers if the threshold quantity of customers is satisfied. The multi-customer offer may identify a dynamic discount for a product and/or service. An amount of the dynamic discount may be based on a total quantity of requests to accept the multi-customer offer. In some implementations, the threshold quantity of customers may be used to allow access to the multi-customer offer (e.g., access to purchase, access to an initial coupon or discount, and/or the like) and a dynamic discount may be added based on a quantity of customers, above the threshold quantity, that request access to the multi-customer offer.

As shown by reference number 106, the merchant platform may provide an identification of the multi-customer offer to the one or more customer devices. In some implementations, the merchant platform may provide the identification via an application programming interface (e.g., associated with the merchant and/or the merchant platform) of the one or more customer devices, a messaging application (e.g., using short message service, multimedia messaging service, rich communication services, email service, and/or the like), and/or the like.

The merchant platform may select customer devices to which the merchant platform provides the identification of the multi-customer offer based on characteristics of the one or more customer devices and/or associated users. In some implementations, the merchant platform may select the one or more customer devices based on the users being potential customers having a relatively high likelihood of requesting to accept the multi-customer offer, when compared with the general population. For example, the merchant platform may select the one or more customer devices based on proximity to a physical location associated with a merchant that is associated with the multi-customer offer, association of the associated users with demographics likely to request to accept the multi-customer offer, purchase history of the associated users, registration for notifications from the merchant and/or the merchant platform, and/or the like.

The merchant platform may select the one or more customer devices by performing a scoring process using one or more characteristics of the one or more customer devices. The scoring process may include weighting one or more of the characteristics based on relative importance of the one or more characteristics in affecting a likelihood of a user requesting to accept the multi-customer offer. The scoring process may be based on performing a machine learning process to train a model to determine characteristics of the one or more customer devices and/or associated users that influence a likelihood of requesting to accept the multi-customer offer.

As described herein, the merchant platform may use one or more artificial intelligence techniques, such as machine learning, deep learning, and/or the like to identify one or more customer devices having a relatively high likelihood of requesting to accept the multi-customer offer, when compared with the general population.

In some implementations, the merchant platform may parse natural language descriptions of characteristics of a plurality of historical multi-customer offers, customer devices and/or associated users that received identifications of the plurality of historical multi-customer offers, and/or the like. For example, the merchant platform may obtain data identifying, in natural language, descriptions of characteristics of historical multi-customer offers, customer devices, and/or associated users, and may parse the data to identify parameters associated with customer devices that requested to accept the historical multi-customer offers, and/or the like.

In some implementations, the merchant platform may determine characteristics of historical multi-customer offers and/or customer devices (and/or associated users) that received an identification of the historical multi-customer offers based on natural language processing of unstructured data, which may include a description of the historical multi-customer offers, the customer devices, and/or the associated user. For example, based on a description of characteristics of a multi-user offer being for a "Red Berry Smoothie available at Smoothie Shop" and a description of the customer device and the associated user that requested to accept the multi-customer offer being "the user is a 42-year-old female and is located within 0.5 miles of the location associated with the merchant that is associated with the multi-customer offer", the merchant platform may use natural language processing to determine that characteristics of the multi-user offer include that the product is a smoothie and that the merchant is "Smoothie Shop" and that characteristics of the customer device include that the customer device is associated with a location and/or a distance from the location associated with the merchant that is associated with the multi-customer offer, and a user that is a 42-year-old female. Similarly, the description of the characteristics may include whether the associated user has previously purchased a product or service associated with the multi-customer offer, the associated user has previously purchased a product or service related to the product or service associated with the multi-customer offer, the associated user has authorized notifications (e.g., a push notification, text message, and/or the like) from the merchant platform and/or a device associated with the merchant that is associated with the multi-customer offer, the associated user is a recent customer, the customer device was recently (as defined by a timing threshold) located within a threshold distance of the location associated with the merchant, location patterns that indicate a relatively high likelihood of the customer device entering within a threshold distance from the location associated with the merchant, the customer device has a local application associated with the merchant, and/or the like.

In this way, the merchant platform may identify characteristics associated with successful (e.g., resulting in an increased likelihood of receiving a request to accept the multi-customer offer) solicitations for requests to accept multi-customer offers, as described herein. Based on applying a rigorous and automated process associated with identifying characteristics associated with successful solicitations for request to accept multi-customer offers, the merchant platform enables recognition and/or identification of thousands or millions of parameters for thousands or millions of combinations of characteristics of one or more of: characteristics of a plurality of multi-customer offers, characteristics of a plurality of customer devices, characteristics of a plurality of associated users, and/or the like, thereby increasing an accuracy and consistency of identifying one or more customer devices and/or associated users having a relatively high likelihood of requesting to accept a particular multi-customer offer, relative to requiring computing resources to be allocated for hundreds or thousands of technicians to manually identify one or more customer devices having a relatively high likelihood of requesting to accept the multi-customer offer, based on of the thousands or millions of combinations of characteristics of one or more of characteristics of a plurality of multi-customer offers, characteristics of a plurality of customer devices, characteristics of a plurality of associated users, and/or the like.

In some implementations, the merchant platform may determine whether characteristics of one or more of: characteristics of a plurality of multi-customer offers, characteristics of a plurality of customer devices, characteristics of a plurality of associated users, and/or the like correspond to an increased likelihood of successfully identifying one or more customer devices and/or associated users having a relatively high likelihood of requesting to accept a particular multi-customer offer, as described herein. For example, using relationships among characteristics of historical multi-customer offers, customer devices and/or users that received an identification of the historical multi-customer offers, and/or the like, the merchant platform may determine whether a particular customer device has a relatively high likelihood of requesting to accept a particular multi-customer offer.

In this case, the merchant platform may generate a model of customer device identification. For example, the merchant platform or another device may train a model using information that includes a plurality of characteristics of historical multi-customer offers, a plurality of characteristics of customer devices and/or associated users that received an indication of the historical multi-customer offers, and/or the like, to determine whether a particular customer device has a relatively high likelihood of requesting to accept a particular multi-customer offer. As an example, the merchant platform may determine that relationships among characteristics of historical multi-customer offers and characteristics of customer devices and/or associated users, are associated with a threshold probability of being associated with a relatively high, or increased, likelihood of the customer devices providing requests to accept the historical multi-customer offers.

In some implementations, the merchant platform may use a scoring system (e.g., with relatively high scores and/or relatively low scores) to identify and/or classify relationships among characteristics of historical multi-customer offers and characteristics of customer devices and/or associated users as being associated with a relatively high, or increased, likelihood of the customer devices providing requests to accept the historical multi-customer offers. In this case, the merchant platform may determine that a relatively high score (e.g., as being likely to be identified) is to be assigned to relationships among characteristics of historical multi-customer offers and characteristics of customer devices and/or associated users that are determined to be the same or similar as previously identified relationships among characteristics of historical multi-customer offers and characteristics of customer devices and/or associated users that resulted in a relatively high, or increased, likelihood of the customer devices providing requests to accept the historical multi-customer offers (or more frequently identified than past identified relationships). In contrast, the merchant platform may determine that a relatively low score (e.g., as being unlikely to be identified) is to be assigned to relationships among characteristics of historical multi-customer offers and characteristics of customer devices and/or associated users that are determined to be different than previously identified relationships among characteristics of historical multi-customer offers and characteristics of customer devices and/or associated users that resulted in a relatively high, or increased, likelihood of the customer devices providing requests to accept the historical multi-customer offers (or less frequently identified than past identified relationships).

In some implementations, the merchant platform may perform a data preprocessing operation when generating the model of customer device identification. For example, the merchant platform may preprocess data (e.g., data that includes information and/or parameters associated with characteristics of the historical multi-customer offers, characteristics of candidate customer devices and/or associated users, and/or the like) to remove non-ASCII characters, white spaces, confidential data (e.g., personally identifiable information, transaction account identifiers, and/or the like), and/or the like). In this way, the merchant platform may organize thousands, millions, or billions of data entries for machine learning and model generation.

In some implementations, the merchant platform may perform a training operation when generating the model of customer device identification. For example, the merchant platform may portion information regarding a relationships among characteristics of historical multi-customer offers and characteristics of customer devices and/or associated users into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the merchant platform may preprocess and/or perform dimensionality reduction to reduce the information regarding relationships among characteristics of historical multi-customer offers and characteristics of customer devices to a minimum feature set. In some implementations, the merchant platform or another device may train the model of customer device identification on this minimum feature set, thereby reducing processing to train the machine learning model, and may apply a classification technique, to the minimum feature set.

In some implementations, the merchant platform may use a classification technique, such as a logistic regression classification technique, a random forest classification technique, a gradient boosting machine learning (GBM) technique, and/or the like, to determine a categorical outcome (e.g., that a particular customer device has a relatively high likelihood of requesting to accept a particular multi-customer offer, that a particular customer device does not have a relatively high likelihood of requesting to accept a particular multi-customer offer, and/or the like). Additionally, or alternatively, the merchant platform may use a naïve Bayesian classifier technique. In this case, the merchant platform may perform binary recursive partitioning to split the data of the minimum feature set into partitions and/or branches and use the partitions and/or branches to perform predictions (e.g., that a particular customer device does not have a relatively high likelihood of requesting to accept a particular multi-customer offer, and/or the like). Based on using recursive partitioning, the merchant platform may reduce utilization of computing resources relative to manual, linear sorting and analysis of data items, thereby enabling use of thousands, millions, or billions of data items to train a model, which may result in a more accurate model than using fewer data items.

Additionally, or alternatively, the merchant platform may use a support vector machine (SVM) classifier technique to generate a non-linear boundary between data items in the training set. In this case, the non-linear boundary is used to classify test data (e.g., data relating relationships among characteristics of historical multi-customer offers and characteristics of customer devices and/or associated users) into a particular class (e.g., a class indicating that the that a particular customer device has a relatively high likelihood of requesting to accept a particular multi-customer offer, a class indicating that the that a particular customer device does not have a relatively high likelihood of requesting to accept a particular multi-customer offer, and/or the like).

Additionally, or alternatively, where the test data includes image data, video data, and/or the like, the merchant platform may use a computer vision technique, such as a convolutional neural network technique to assist in classifying test data (e.g., data relating to relationships among characteristics of historical multi-customer offers and characteristics of customer devices and/or associated users) into a particular class (e.g., a class indicating that the particular customer device has a relatively high likelihood of requesting to accept a particular multi-customer offer, a class indicating that the particular customer device does not have a relatively high likelihood of requesting to accept a particular multi-customer offer, and/or the like). In some cases, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an object in motion technique (e.g., an optical flow framework and/or the like), and/or the like.

Additionally, or alternatively, the merchant platform or another device may train the model of customer device identification using a supervised training procedure that includes receiving input to the model from a subject matter expert, which may reduce an amount of time, an amount of processing resources, and/or the like to train the model of customer device identification relative to an unsupervised training procedure. In some implementations, the merchant platform may use one or more other model training techniques, such as a neural network technique, a latent semantic indexing technique, and/or the like. For example, the merchant platform may perform an artificial neural network processing technique (e.g., using a two-layer feedforward neural network architecture, a three-layer feedforward neural network architecture, and/or the like) to perform pattern recognition with regard to patterns of whether characteristics of historical multi-customer offers and characteristics of customer devices and/or associated users described using different semantic descriptions correspond to whether a particular customer device has a relatively high likelihood of requesting to accept a particular multi-customer offer or not. In this case, using the artificial neural network processing technique may improve an accuracy of a model (e.g., the model of customer device identification) generated by the merchant platform by being more robust to noisy, imprecise, or incomplete data, and by enabling the merchant platform to detect patterns and/or trends undetectable to human analysts or systems using less complex techniques.

As an example, the merchant platform may use a supervised multi-label classification technique to train the model. For example, as a first step, the merchant platform may map relationships among characteristics of historical multi-customer offers and characteristics of customer devices and/or associated users. In this case, the relationships may be characterized as corresponding to whether a particular customer device has a relatively high likelihood of requesting to accept a particular multi-customer offer based on characteristics of the relationships (e.g., whether relationship is similar or associated with a relationship that corresponds to an indication of whether a particular customer device has a relatively high likelihood of requesting to accept a particular multi-customer offer) and an analysis of the characteristics of historical multi-customer offers and characteristics of customer devices and/or associated users (e.g., by a technician, thereby reducing processing relative to the merchant platform being required to analyze each activity).

As a second step, the merchant platform may determine classifier chains, whereby labels of target variables may be correlated (e.g., in this example, labels may be relationships among characteristics of historical multi-customer offers and characteristics of customer devices and/or associated users and correlation may refer to a common relationship that indicates whether a particular customer device has a relatively high likelihood of requesting to accept a particular multi-customer offer). In this case, the merchant platform may use an output of a first label as an input for a second label (as well as one or more input features, which may be other data relating to the relationships among characteristics of historical multi-customer offers and characteristics of customer devices and/or associated users), and may determine that a relationship that includes a set of characteristics (some of which are associated with the particular multi-customer offer, candidate customer devices and/or associated users, and/or the like and some of which are not associated with the particular multi-customer offer, candidate customer devices and/or associated users, and/or the like) are associated with the particular outcome that the relationship indicates whether a particular customer device has a relatively high likelihood of requesting to accept a particular multi-customer offer based on a similarity to other relationships that include similar characteristics. In this way, the merchant platform transforms classification from a multilabel-classification problem to multiple single-classification problems, thereby reducing processing utilization. As a third step, the merchant platform may determine a Hamming Loss Metric relating to an accuracy of a label in performing a classification by using the validation set of the data. For example, an accuracy with which a weighting applied to each relationship between characteristics of historical multi-customer offers and characteristics of customer devices and/or associated users and whether each relationship is associated with indicating whether a particular customer device has a relatively high likelihood of requesting to accept a particular multi-customer offer or not, results in a correct prediction of whether a particular customer device has a relatively high likelihood of requesting to accept a particular multi-customer offer, thereby accounting for differing amounts to which association of any one relationship influences the prediction of whether a particular customer device has a relatively high likelihood of requesting to accept a particular multi-customer offer. As a fourth step, the merchant platform may finalize the model based on labels that satisfy a threshold accuracy associated with the Hamming Loss Metric and may use the model for subsequent prediction of whether relationships among characteristics of historical multi-customer offers and characteristics of customer devices and/or associated users are to result in a particular customer device having a relatively high likelihood of requesting to accept a particular multi-customer offer.

As another example, the merchant platform may determine, using a linear regression technique, that a threshold percentage of relationships, in a set of relationships, do not result in a particular customer device having a relatively high likelihood of requesting to accept a particular multi-customer offer, and may determine that those relationships are to receive relatively low association scores. In contrast, the merchant platform may determine that another threshold percentage of relationships do result in a particular customer device having a relatively high likelihood of requesting to accept a particular multi-customer offer and may assign a relatively high association score to those relationships. Based on the relationships resulting in a particular customer device having a relatively high likelihood of requesting to accept a particular multi-customer offer or not, the merchant platform may generate the model of customer device identification and may use the model of customer device identification for analyzing new relationships among characteristics of historical multi-customer offers and characteristics of customer devices and/or associated users, and/or the like that the merchant platform identifies.

In some implementations, a different device, such as a server device, may generate and train the model. The different device may send the model for use by the merchant platform. The different device may update and send (e.g., on a scheduled basis, on an on-demand basis, on a triggered basis, on a periodic basis, and/or the like) the model to the merchant platform.

Accordingly, the merchant platform may use any number of artificial intelligence techniques, machine learning techniques, deep learning techniques, and/or the like to determine whether a particular customer device has a relatively high likelihood of requesting to accept a particular multi-customer offer.

By intelligently selecting the one or more customer devices to which the merchant platform provides the identification of the multi-customer offer, the merchant platform may conserve computing resources that might otherwise be used to provide a notification of the multi-customer offer to the general population.

Figure 1B:
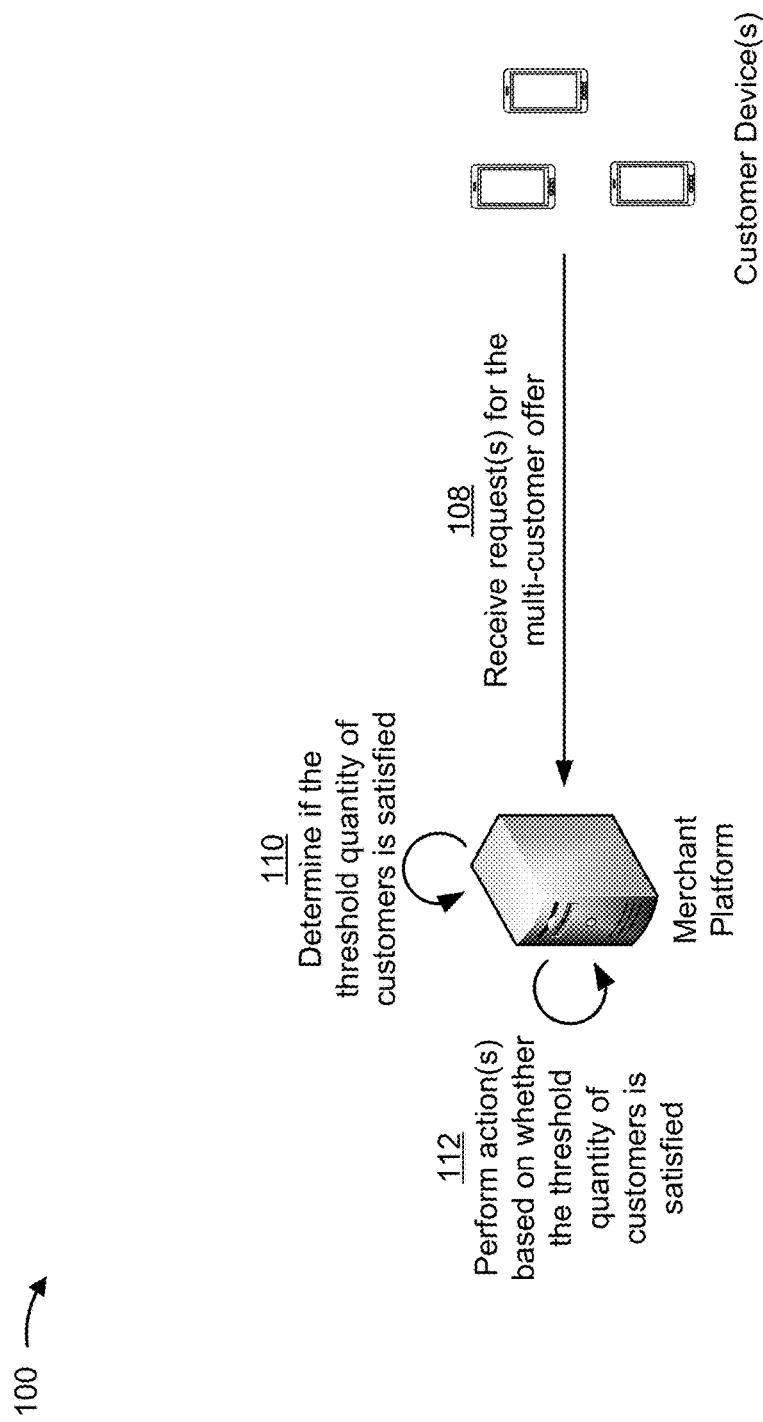

As shown in FIG. 1B, and by reference number 108, the merchant platform may receive one or more requests to accept the multi-customer offer from one or more of the customer devices. In some implementations, a request may include information for a payment method. The request may obligate the associated user to complete a transaction based on the multi-customer offer by authorizing payment using the information for the payment method. The authorization for payment may be contingent upon satisfying the threshold quantity of customers.

By receiving information for a payment method along with a request to accept the multi-customer offer, the merchant platform may conserve computing resources that might otherwise be used to allow access to the multi-customer offer, begin receiving payment information from users of the customer devices, and then canceling one or more transactions based on withdrawal of users from the multi-customer offer after the merchant platform determines that the threshold is satisfied.

In some implementations, the merchant platform may process payments for the customer devices based on receiving the requests to accept the multi-customer offer. The merchant platform may process payments when respective requests are received, when a quantity of received requests satisfies a threshold quantity of requests, when a quantity of received requests satisfies a threshold percentage of the threshold quantity of customers, and/or the like.

In some implementations, the one or more requests are configured to expire after a time period. For example, a request to accept a multi-customer offer relating to purchasing a perishable item (e.g., food or a drink) may be limited in time. In some implementations, the time period for expiration may be predetermined by the merchant platform or another device associated with the merchant that is associated with the multi-customer offer. In some implementations, a customer device may provide (e.g., with an offer) an indication of a customized time period for expiration of an associated request to accept the multi-customer offer. For example, the customer may set a customized time period for expiration of a request to accept the multi-customer offer based on an amount of time the customer is willing to wait for the multi-customer offer to be available.

In this way, computing resources may be conserved, which may otherwise have been used to cancel one or more transactions based on withdrawal of users from the multi-customer offer, based on no longer being interested in the product or service (e.g., because the users are no longer in proximity of the location associated with the merchant), and/or the like.

In some implementations, the one or more customer devices may provide the one or more requests via an interactive webpage, an application programming interface, and/or the like that is associated with the merchant platform and/or a device associated with the merchant that is associated with the multi-customer offer.

In some implementations, the one or more customer devices may include a shared customer device through which multiple customers may provide requests for the multi-customer offer. For example, the shared customer device may be a customer-facing kiosk.

The one or more customer devices may receive indications of the threshold quantity of customers, a quantity of currently requesting customers, a quantity of additional customers needed to unlock the multi-customer offer, and/or the like. The one or more customer devices may receive the indications before providing the one or more requests and/or after providing the one or more requests. In some implementations, the one or more customer devices may receive updates (e.g., live or periodic) of the indications. In this way, computing resources may be conserved, which may otherwise be used to provide a request to the multi-customer offer when the multi-customer offer is not likely to be unlocked and then withdraw the request upon failure to satisfy the threshold quantity.

As shown by reference number 110, the merchant platform may determine if the threshold quantity of customers is satisfied. In some implementations, the merchant platform may compare a quantity of received requests for the multi-customer offer with the threshold quantity. The merchant platform may compare only those requests that were received within a predetermined amount of time, since the multi-customer offer was initiated (e.g., since a prior expiration period, since providing the identification of the multi-customer offer, and/or the like), and/or the like. In this way computing resources may be conserved which may otherwise have been used to cancel one or more transactions based on withdrawal of users from the multi-customer offer, based on no longer being interested in the product or service (e.g., because the users are no longer in proximity of the location associated with the merchant and/or have purchased an alternative product or service), and/or the like.

As shown by reference number 112, the merchant platform may perform one or more actions based on whether the threshold quantity of customers is satisfied. In some implementations, if the threshold quantity of customers is satisfied, the merchant platform may unlock the multi-customer offer to allow access to the one or more customer devices to accept the multi-customer offer.

In some implementations when the threshold quantity of customers is satisfied, the merchant platform may process payments for the customer devices to complete a purchase according to the multi-customer offer. For example, if a customer device, or an associated user, has already provided payment information and authorization to charge the payment method, the merchant platform may automatically charge the payment method without further input from the customer device. The merchant platform may provide a receipt, coupon, and/or the like based on processing the payment for the customer device. The merchant platform may process payments immediately upon satisfaction of the threshold quantity of customers or may process payments after a time interval. For example, the merchant platform may wait for a predetermined time after satisfaction of the threshold quantity of customers to allow for additional customer devices to request to accept the multi-customer offer after it is unlocked.

In this way, computing resources may be conserved, which may otherwise have been used to request payment information from the customer devices, receive payment information from the customer devices, and/or cancel payments based on users withdrawing from the multi-customer offer resulting in no longer satisfying the threshold quantity of customers.

If the threshold quantity of customers is not satisfied, the merchant platform may provide a notification, indicating that the threshold quantity of customers is not satisfied, to the one or more customer devices that previously provided a request to accept the multi-customer offer. In some implementations, the merchant platform may provide information to the one or more customer devices, which information may be used by the one or more customer devices to provide a notification of the multi-customer offer to other customer devices (e.g., by forwarding the information to the other customer devices). In this way, the one or more customer devices can perform actions that increase a likelihood of satisfying the threshold quantity of customers, which may conserve computing resources that may otherwise have been used by the merchant platform attempting to solicit candidate customer devices to request to accept the multi-customer offer.

In some implementations in which the threshold quantity of customers is not satisfied, the merchant platform may request input from one or more customer devices, which input may be used by the merchant platform to identify one or more candidate customer devices to which the merchant platform may provide a notification of the multi-customer offer. For example, the merchant platform may request a referral of a candidate customer device to which the merchant platform may provide the multi-customer offer. In some implementations, the merchant platform may provide an incentive to the one or more customer devices for providing the referral of the candidate customer device. The incentive may be contingent on the referral providing a request to accept the multi-customer offer.

In some implementations, the merchant platform may request demographic information about the users associated with the one or more customer devices, location information of the one or more customer devices, an amount of time for which the one or more requests are active (e.g., how long the associated user is willing to wait for the threshold quantity to be satisfied before withdrawing a request to accept the multi-customer offer), and/or the like. The merchant platform may use one or more of these to identify candidate customer devices that have a likelihood to request to accept the multi-customer offer before other requests to the accept the multi-customer offer are withdrawn.

By intelligently identifying candidate customer devices and/or potential customers, the merchant platform may conserve computing resources that might otherwise be used to provide a notification of the multi-customer offer to the general population.

Figure 1C:
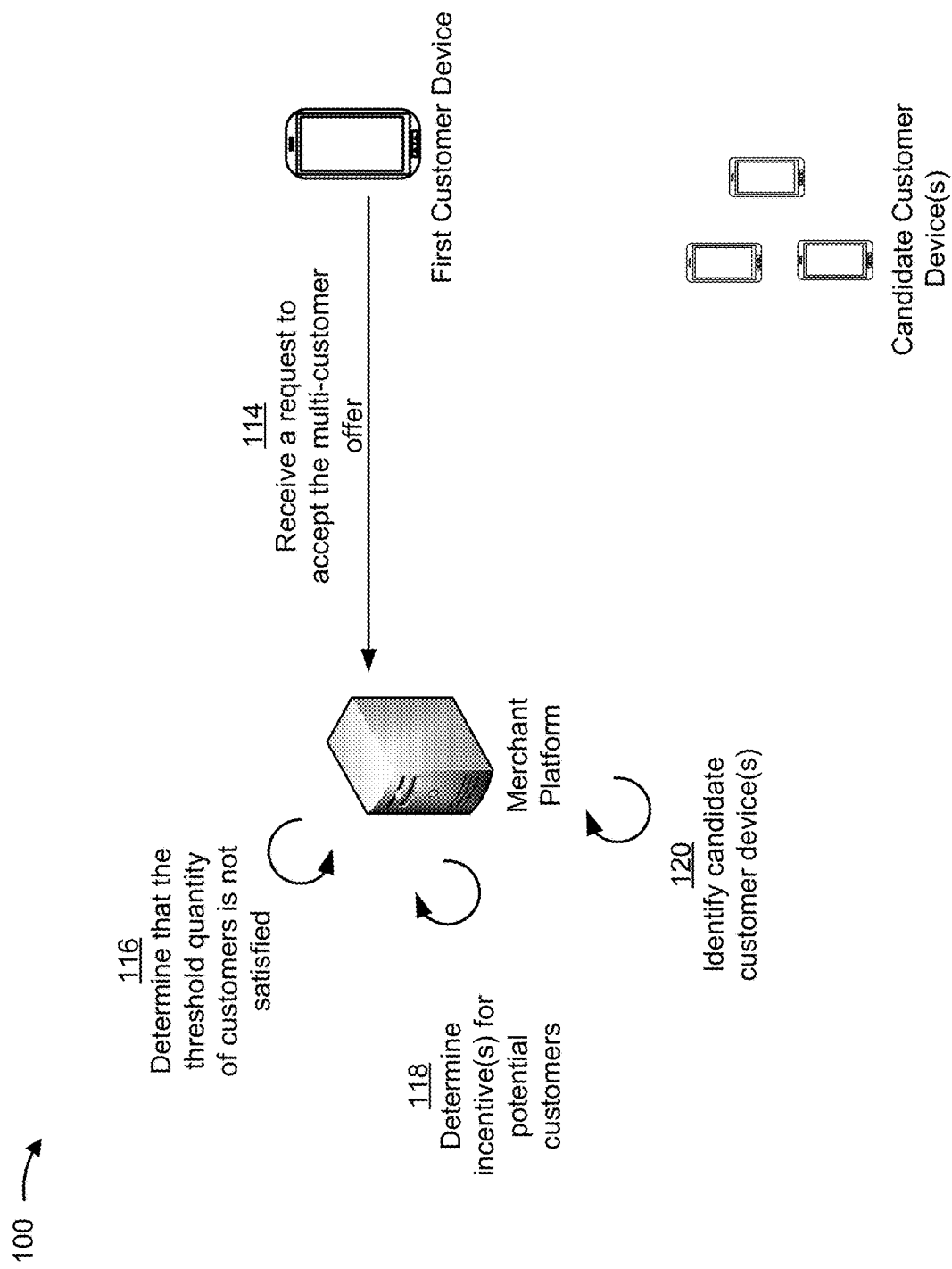

As shown in FIG. 1C, and by reference number 114, the merchant platform may receive a request to accept the multi-customer offer from a first customer device. In some implementations, when the merchant platform receives the request from the first customer device, the merchant platform begins a time period for receiving enough requests to accept the multi-customer offer to satisfy the threshold quantity of customers. In some implementations, the merchant platform may set a corresponding expiration period after which, if the threshold quantity is not satisfied, the request from the first customer device is rejected.

In this way computing resources may be conserved which may otherwise have been used to cancel one or more transactions based on withdrawal of users from the multi-customer offer, based on no longer being interested in the product or service (e.g., because the users are no longer in proximity of the location associated with the merchant and/or have purchased an alternative product or service), and/or the like.

As shown by reference number 116, the merchant platform may determine that the threshold quantity of customers is not yet satisfied. In some implementations, the merchant platform may also determine that the request from the first customer device is not yet rejected and/or that the request is not withdrawn.

As shown by reference number 118, the merchant platform may determine one or more incentives for potential customers. The one or more incentives may be determined to increase a likelihood of a potential customer requesting acceptance to the multi-customer offer.

In some implementations, incentives may be determined to have an effectiveness based on characteristics of the incentives, candidate customer devices, and/or respective users of the candidate customer devices. A particular incentive may be determined to be effective for a particular demographic relative to a general population. For example, an incentive may be effective by providing a discount for another product or service that is commonly purchased by customers associated with the particular demographic. Additionally, or alternatively, an incentive may be effective by providing a discount, to the product or service associated with the multi-customer offer, that is an amount that is tailored to motivate users associated with the particular demographic to request to accept the multi-customer offer.

By intelligently determining effectiveness of incentives for candidate customer devices and/or potential customers, the merchant platform can select incentives that have a relatively high likelihood of producing a desired result of satisfying the threshold quantity of customers. This may conserve computing resources that might otherwise be used to provide ineffective incentives and/or provide a same incentive to the general population.

In some implementations, the merchant platform may determine the one or more incentives using a machine learning process, as described above. The merchant platform may use the machine learning process to train an incentives model based on historical outcomes of providing incentives to potential customers.

The merchant platform may use and/or train an incentives model to determine and/or select an incentive to increase a likelihood that one or more candidate customer devices provide requests to accept the particular multi-customer offer. The merchant platform or another device may train the incentives model in a manner similar to the model for customer device identification, using parameters, such as amounts of historical incentives, types of historical incentives, demographics of users associated with candidate customer devices; current, previous, and/or predicted future locations of the candidate customer devices; whether the associated users had previously purchased a product or service associated with the multi-customer offer; whether associated users had previously purchased a product or service related to the product or service associated with the multi-customer offer; whether the associated users had authorized notifications (e.g., a push notification, text message, and/or the like) from the merchant platform and/or a device associated with the merchant that is associated with the multi-customer offer; whether the associated users were recent customers; whether the candidate customer devices were recently (as defined by a timing threshold) located within a threshold distance of the location associated with the merchant; whether location patterns indicated a relatively high likelihood of the candidate customer device entering within a threshold distance from the location associated with the merchant; whether the candidate customer devices had local applications associated with the merchant; relationships between characteristics of the historical incentives, multi-customer offers, the candidate customer devices, and/or the associated users; and/or the like. The merchant platform may use the candidate identification model to identify one or more candidate customer devices to which to send a notification of the multi-customer offer.

The merchant platform or another device may train the incentives model based on historical data, such as characteristics of a plurality of incentives, characteristics of a plurality of customer devices, characteristics of a plurality of associated users, characteristics of multi-customer offers, historical outcomes of providing the plurality of incentives to the plurality of customer devices, and/or the like. The model may determine relationships among the characteristics and whether the relationships affect the effectiveness of the plurality of incentives in increasing a likelihood of customer devices accepting the multi-customer offers.

The merchant platform or another device may train the incentives model to determine, for a particular incentive with particular characteristics and for a particular multi-customer offer with particular characteristics, which characteristics of customer devices and/or associated users are indicative of customer devices and/or associated users that are predicted to (or have an increased likelihood to) use the particular incentive and accept the particular multi-customer offer. In some implementations, the merchant platform or another device may train the incentives model to determine, for a particular multi-customer offer with particular characteristics, characteristics of incentives that are predicted to be used by customer devices with certain characteristics, and/or associated users with certain characteristics, for the particular multi-customer offer. In other words, the incentives model may select an incentive for one or more customer devices based on the incentive producing a relatively high likelihood of the one or more customer devices requesting to accept the multi-customer offer. The incentives model may select the incentive based on producing a highest likelihood, relative to other available incentives. Additionally, or alternatively, the incentives model may select the incentive based on being a smallest (e.g., lowest cost to the merchant) incentive that satisfies a threshold likelihood of the one or more customer devices requesting to accept the multi-customer offer, a quantity of the one or more customer devices requesting to accept the multi-customer offer being sufficient to satisfy the threshold quantity of customers, and/or the like.

In some implementations, the merchant platform may train and/or use the incentives model to select incentives to provide to one or more of the one or more customer devices described above. For example, the merchant platform may use the incentives model to select one or more incentives to provide to the customer devices before receiving a request to accept the multi-customer offer and/or before determining that the threshold quantity of customers is not met. The merchant platform may provide the selected incentives with the identification of the multi-customer offer. In some implementations, the merchant platform may provide incentives to only a proper subset of the customer devices. In some implementations, the merchant platform may provide different incentives to different customer devices of the one or more customer devices.

As shown by reference number 120, the merchant platform may identify one or more candidate customer devices and/or associated users that are potential customers. The merchant platform may identify the one or more candidate customer devices and/or associated users based on the associated users having a likelihood of requesting to accept the multi-customer offer, with the likelihood satisfying a threshold. The merchant platform may use one or more machine learning processes to identify the one or more candidate devices and/or associated users, such as one or more machine learning processes described above.

The merchant platform may use and/or train a candidate identification model to identify one or more candidate customer devices associated with users having a likelihood of requesting to accept the multi-customer offer. The merchant platform or another device may train the candidate identification model in a manner similar to the model for customer device identification, using parameters, such as demographics of users associated with candidate customer devices; current, previous, and/or predicted future locations of the candidate customer devices; whether the associated users had previously purchased a product or service associated with the multi-customer offer; whether associated users had previously purchased a product or service related to the product or service associated with the multi-customer offer; whether the associated users had authorized notifications (e.g., a push notification, text message, and/or the like) from the merchant platform and/or a device associated with the merchant that is associated with the multi-customer offer; whether the associated users were recent customers; whether the candidate customer devices were recently (as defined by a timing threshold) located within a threshold distance of the location associated with the merchant; whether location patterns indicated a relatively high likelihood of the candidate customer device entering within a threshold distance from the location associated with the merchant; whether the candidate customer devices had local applications associated with the merchant; relationships between characteristics of the multi-customer offer, the candidate customer devices, and/or the associated users; and/or the like. The merchant platform may use the candidate identification model to identify one or more candidate customer devices to which to send a notification of the multi-customer offer.

In some implementations, the merchant platform may identify the one or more candidate customer devices based on the one or more candidate customer devices being in proximity of (e.g., within a threshold distance from) a physical location associated with the merchant that is associated with the multi-customer offer, the one or more candidate customer devices and/or associated users being associated with one or more customer devices and/or associated users that have already requested to accept the multi-customer offer, the one or more candidate customer devices being associated with an application that is associated with the merchant, and/or the like. In some implementations, the merchant platform may identify the one or more candidate customer devices based on the one or more candidate customer devices providing, previous to the identification, an authorization to receive push notifications (e.g., via a messaging service, an application programming interface, and/or the like).

In some implementations, the merchant platform may identify the one or more candidate customer devices based on information regarding previous purchases by the associated users (e.g., via the candidate customer devices). For example, the merchant platform may identify the one or more candidate customer devices based on the associated users previously purchasing the same or a related product or service that is associated with the multi-customer offer from the merchant or from another merchant. In some implementations, the merchant platform may identify the one or more candidate customer devices based on an indication of timing at which the associated users previously purchased the product or service. For example, in some instances, the merchant platform may not identify a user as a potential customer if the user has already purchased the product or service within a threshold period of time before the merchant platform identifies the one or more candidate customer devices. In some instances, the merchant platform may identify a user as a potential customer if the user has not yet purchased the product or service, but regularly does purchase the product or service within a threshold amount of time from the time at which the merchant platform identifies the one or more candidate customer devices.

As described above, the merchant platform may identify the one or more candidate customer devices based on demographics of the users associated with the one or more candidate customer devices. In some implementations, the merchant platform may identify the one or more candidate customer devices and/or the associated users based on one or more selected incentives being effective, for the particular demographics of the users associated with the one or more candidate customer devices relative to the general population, for increasing a likelihood of the associated users requesting to accept the multi-customer offer. In some implementations, the merchant platform may identify the one or more candidate customer devices and/or the associated users based on the associated users being associated with a particular demographic that is determined to have an increased likelihood, relative to the general population, of requesting to accept the multi-customer offer based on a product or service that is associated with the multi-customer offer. In some implementations, the merchant platform may identify the one or more candidate customer devices and/or the associated users based on the associated users being associated with a particular demographic that is the demographic of one or more users associated with the customer devices that have already provided a request to accept the multi-customer offer.

The merchant platform may obtain the demographic information based on the customer devices providing authorization to obtain a purchase history of the associated users by the merchant platform.

By intelligently identifying candidate customer devices and/or potential customers, the merchant platform may conserve computing resources that might otherwise be used to provide a notification of the multi-customer offer to the general population.

In some implementations, the merchant platform may identify the one or more candidate customer devices before or in conjunction with selecting one or more incentives to provide to the one or more candidate customer devices. For example, the merchant platform may determine the least amount of an incentive to increase a likelihood that enough candidate customer devices will provide a request to accept the multi-customer offer to satisfy the threshold quantity. The amount of the incentive may be based on which candidate customer devices are identified. In other words, the amount of the incentive may be tailored to the candidate customer devices based on, for example, characteristics of the candidate customer devices and/or the associated users.

By intelligently identifying candidate customer devices and/or potential customers along with associated incentives, the merchant platform may conserve computing resources that might otherwise be used to provide an ineffective incentive via a notification of the multi-customer offer.

Figure 1D:
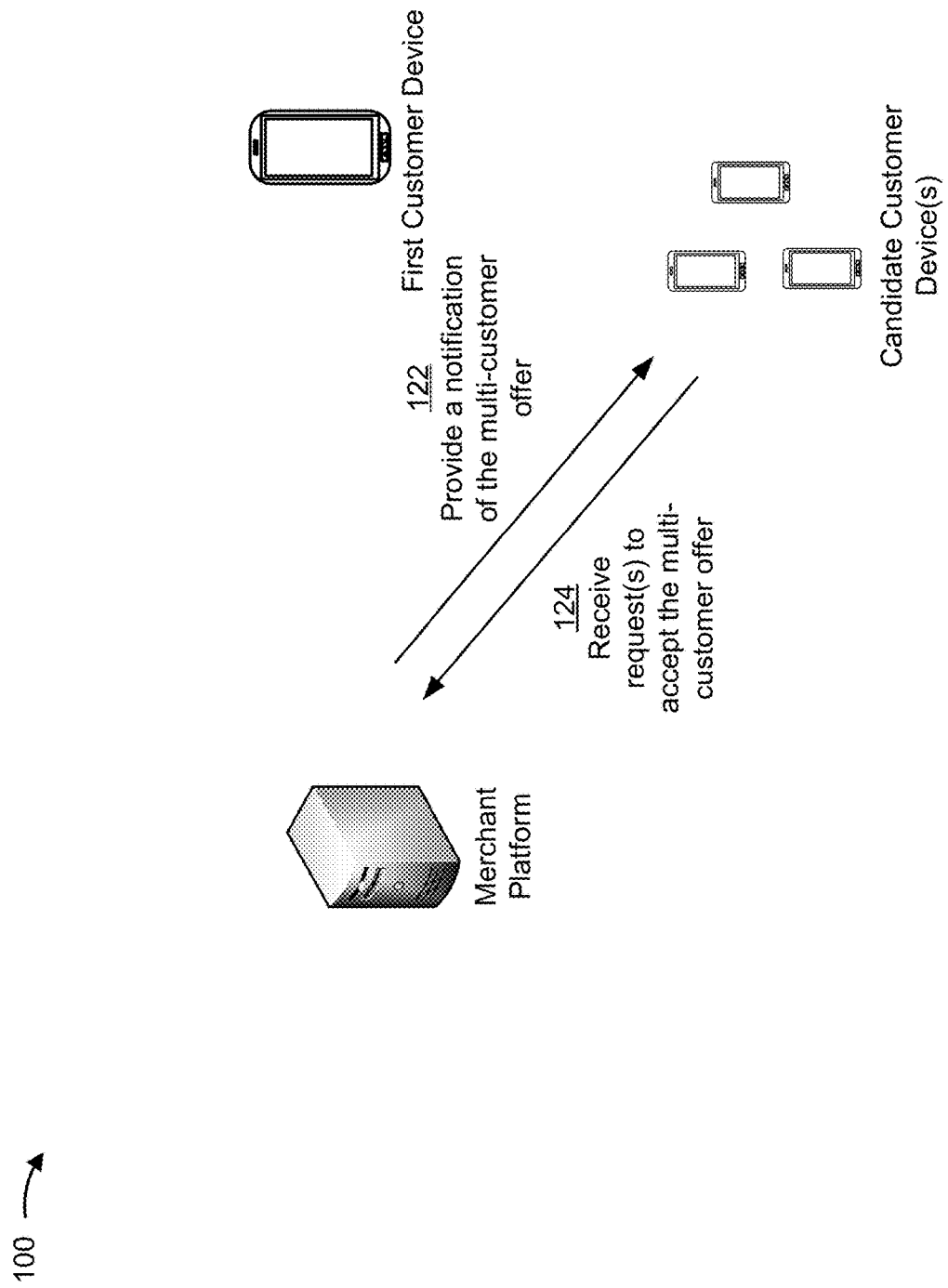

As shown in FIG. 1D, and by reference number 122, the merchant platform may provide a notification of the multi-customer offer to the one or more candidate customer devices. In some implementations, the notification includes additional information, such as an indication of one or more incentives for accepting the multi-customer offer, an indication of a difference between a quantity of the one or more requests to accept the multi-customer offer and the threshold quantity, a remaining amount of time until the multi-customer offer expires, and/or the like.

In some implementations, the merchant platform may provide the notification via a messaging service, an application programming interface, a message via a push notification, and/or the like. The merchant platform may provide updates to the notification such as a change to an incentive, a quantity of remaining requests to accept the multi-customer offer until the multi-customer offer is unlocked, a remaining amount of time until the multi-customer offer expires, and/or the like.

In some implementations, the incentive may increase as the multi-customer offer approaches expiration. In some implementations, the incentive may decrease (e.g., after expiration of an amount of time, after receiving one or more additional requests to accept the multi-customer offer, and/or the like) such that an incentive diminishes if a candidate customer device delays requesting to accept the multi-customer offer. In this way, the merchant platform may provide an incentive to quickly respond to the notification, which may increase a likelihood that the threshold quantity of customers will be reached. This may conserve computing resources, which may otherwise have been used to cancel or unwind transactions with the customer devices that have already requested to accept the multi-customer offer if the threshold quantity of customers is not reached.

As shown by reference number 124, the merchant platform may receive one or more additional requests to accept the multi-customer offer from the one or more customer devices. In some implementations, the merchant platform may receive the one or more additional requests via an application programming interface operating on the one or more candidate customer devices, an interactive website, a messaging service, an application executing on the one or more candidate customer devices, and/or the like.

Figure 1E:
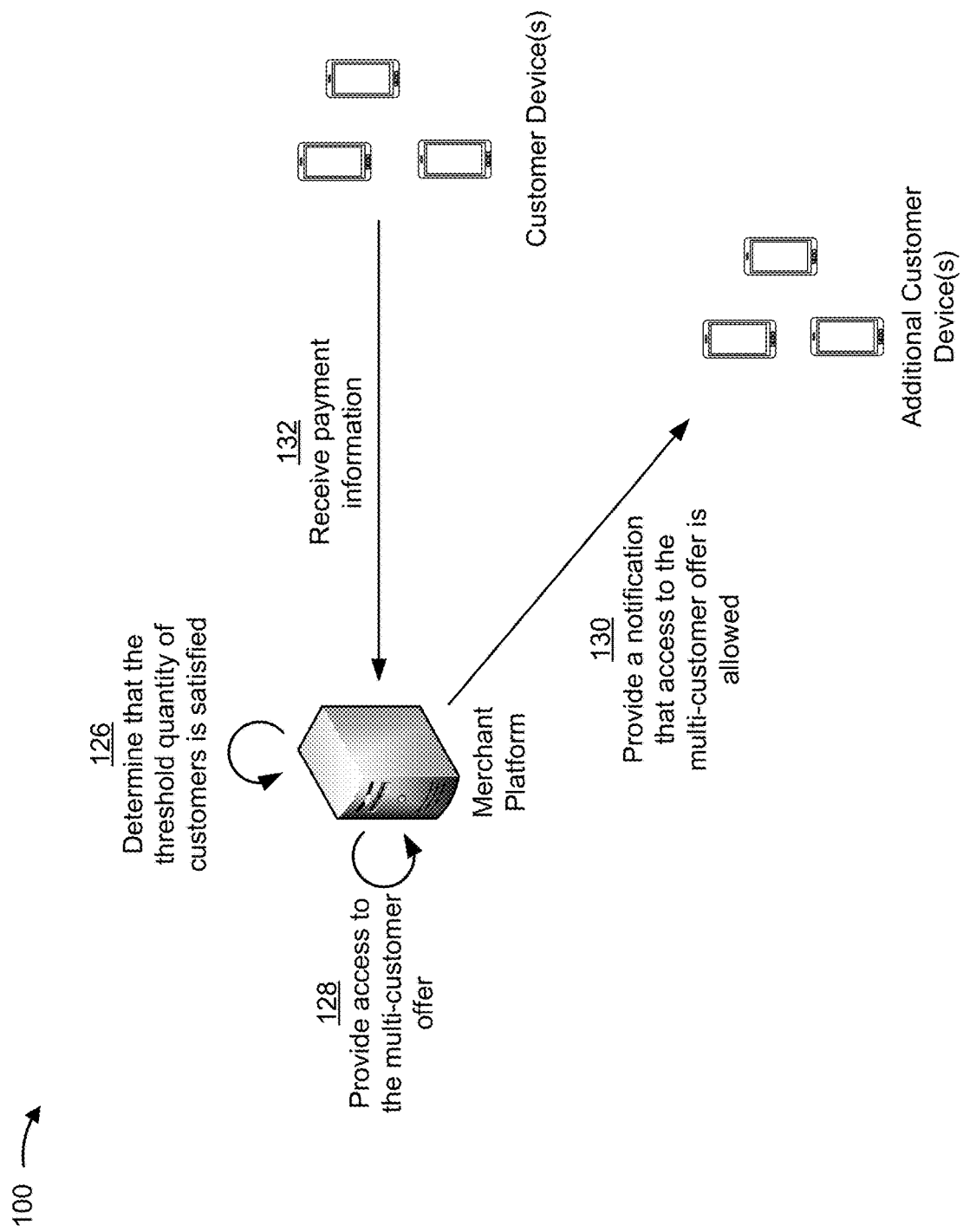

As shown in FIG. 1E, and by reference number 126, the merchant platform may determine that the threshold quantity of customers is satisfied. For example, the merchant platform may determine that a total quantity of customer devices (including the first customer device, the one or more customer devices, the candidate customer devices, and/or the like) satisfies the threshold quantity.

As shown by reference number 128, the merchant platform may provide access to the multi-customer offer based on the threshold quantity of customers being satisfied. For example, the merchant platform may allow for the one or more customer devices that have already requested access to complete a purchase of the product or service associated with the multi-customer offer. In some implementations, other customers using a customer device may also complete a purchase of the product or service associated with the multi-customer offer.

As shown by reference number 130, the merchant platform may provide a notification that access to the multi-customer offer is allowed to one or more additional customer devices. In some implementations, the one or more additional customer devices may be selected for notifying based on characteristics of the additional customer devices and/or associated users. The selection process may be similar to the process for identifying the one or more candidate customer devices discussed above. The notification to the one or more additional customer devices may include an incentive or may not include an incentive to request to accept the multi-customer offer. In some implementations, the notification to the one or more additional customer devices is less than an incentive provided to the one or more candidate customer devices as discussed above.

As shown by reference number 132, the merchant platform may receive payment information from the one or more customer devices (which may include the first customer device, one or more candidate customer devices, and/or one or more additional customer devices that requested to accept the multi-customer offer). The merchant platform may receive the payment information after determining that the threshold quantity of customers is satisfied. In some implementations, the merchant platform receives the payment information from one or more customer devices along with a request to accept the multi-customer offer.

Figure 1F:
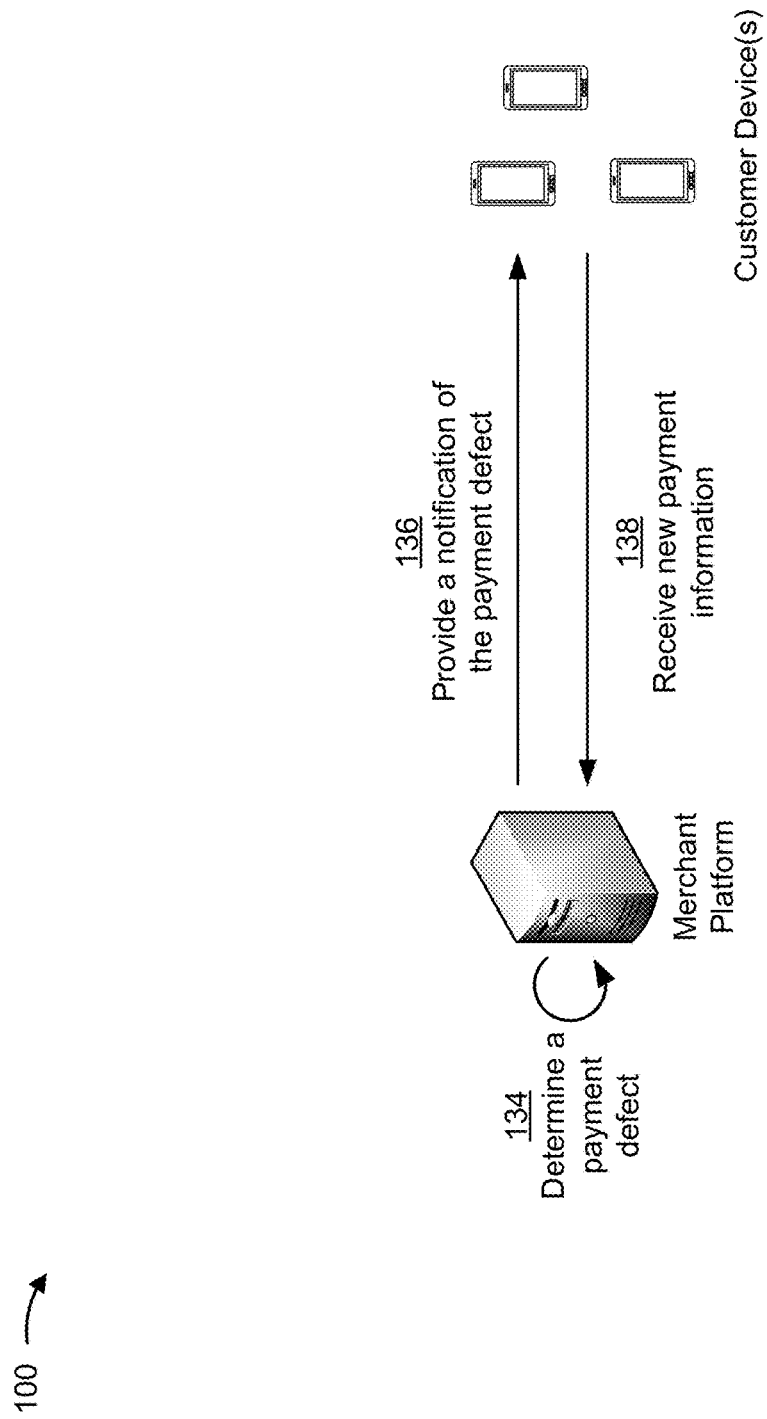

As shown in FIG. 1F, and by reference number 134, the merchant platform may determine a payment defect with the payment information associated with one or more of the customer devices that requested to accept the multi-customer offer. In some implementations, the payment defect may include one or more of a billing address, name, personal identification number, transaction card information, and/or the like that does not match information associated with the payment method. In some implementations, the payment defect may include an expiration of the payment method, exceeding a credit or spending limit associated with the payment method, and/or the like.

Based on determining the payment defect, the merchant platform may perform one or more actions. As shown by reference number 136, the merchant platform may provide a notification of the payment defect to a customer device associated with the payment defect. Additionally, or alternatively, if the payment defect causes the quantity of requests to accept the multi-customer offer to no longer satisfy the threshold quantity, the merchant platform may provide a notification of the multi-customer offer to one or more candidate customer devices, as discussed above. This may conserve computing resources that might otherwise have been used to cancel the transactions of, and provide a notification of the cancelation to, the other customer devices that already requested to accept the multi-customer offer.

As shown by reference number 138, the merchant platform may receive new payment information from one or more of the customer devices (e.g., the customer device associated with the payment defect, a candidate customer device, and/or the like). If the new payment information is valid, the merchant platform may process the associated payment and provide the product or service associated with the multi-customer offer to the one or more customer devices.

As discussed, the techniques described may conserve resources that might otherwise have been used to cancel transactions, communicate the cancelation, and/or the like.

As indicated above, FIGS. 1A-1F are provided as one or more examples. Other examples may differ from what is described with regard to FIGS. 1A-1F.

Figure 2:
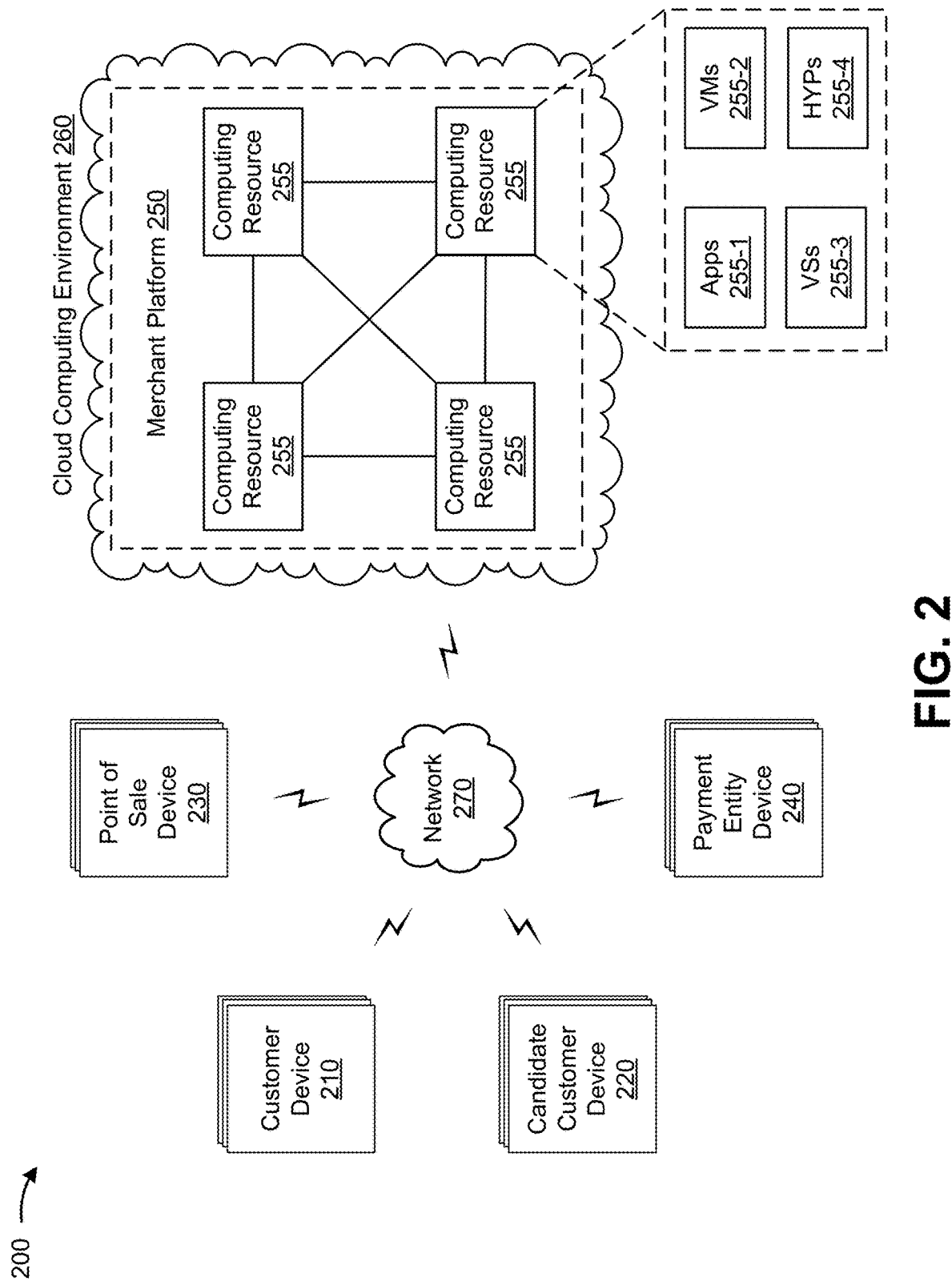
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include one or more customer devices 210 (referred to herein individually as customer device 210 or collectively as customer devices 210), one or more candidate customer devices 220 (referred to herein individually as candidate customer devices 220 or collectively as candidate customer devices 220), one or more point of sale devices 230 (referred to herein individually as point of sale device 230 or collectively as point of sale devices 230), one or more payment entity devices 240 (referred to herein individually as payment entity device 240 or collectively as payment entity devices 240), a merchant platform 250, a computing resource 255, a cloud computing environment 260, a network 270, and/or the like. Devices of environment 200 may interconnect via wired connections, wireless connections, or a combination of wired and wireless connections.

Customer device 210 includes one or more devices capable of receiving, generating, storing, processing, and/or providing information associated with providing a request to accept a multi-customer offer and/or receiving an identification of a multi-customer offer. For example, customer device 210 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), a customer-facing kiosk, and/or a similar type of device.

Similar to customer device 210, candidate customer device 220 includes one or more devices capable of receiving, generating, storing, processing, and/or providing information associated with providing a request to accept a multi-customer offer and/or receiving an identification of a multi-customer offer. For example, customer device 210 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), a customer-facing kiosk, and/or a similar type of device.

Point of sale device 230 includes a device that conducts and completes a transaction at a time and place of the transaction. Point of sale device 230 may calculate an amount owed by a customer (e.g., a user), may indicate that amount, may prepare an invoice for the customer, and may indicate options for the customer to make payment. Point of sale device 230 may be a point at which a customer makes a payment to a merchant in exchange for a product or after provision of a service. After receiving payment, point of sale device 230 may issue a printed or an electronic receipt for the transaction. In some implementation, point of sale device 230 may allow access to complete a transaction for a multi-customer offer only upon satisfaction of a threshold quantity of customers have requested to accept the multi-customer offer. Point of sale device 230 may receive instructions related to allowing access to a multi-customer offer from the merchant platform 250.

Payment entity device 240 includes one or more devices capable of storing, processing, and/or routing information associated with authorizing a transaction based on a payment method. In some implementations, payment entity device 240 may include a communication interface that allows payment entity device 240 to receive information from and/or transmit information to other devices in environment 200. In some implementations, the payment entity device may be associated with a financial institution that issued a payment method to a user associated with a customer device, a candidate customer device, or the like. Payment entity device 240 may receive, from the merchant platform 250, payment information for a transaction associated with the multi-customer offer. If the payment information is valid, payment entity device 240 may transfer funds to a merchant associated with the multi-customer offer. If the payment information includes a payment defect, the payment entity device may decline the transaction and may provide an indication of the payment defect to the merchant platform.

Merchant platform 250 includes one or more computing resources assigned to provide a multi-customer offer and/or to attempt to receive a sufficient quantity of requests to accept the multi-customer offer to satisfy a threshold quantity. For example, merchant platform 250 may be a platform implemented by cloud computing environment 260 that may store and/or use an incentives model and/or a model for identifying one or more candidate customer devices. In some implementations, merchant platform 250 is implemented by computing resources 255 of cloud computing environment 260.

Merchant platform 250 may include a server device or a group of server devices. In some implementations, merchant platform 250 may be hosted in cloud computing environment 260. Notably, while implementations described herein may describe merchant platform 250 as being hosted in cloud computing environment 260, in some implementations, merchant platform 250 may be non-cloud-based or may be partially cloud-based. Additionally, merchant platform 250 may be implemented in a system of multiple physical devices.

Cloud computing environment 260 includes an environment that delivers computing as a service, whereby shared resources, services, and/or the like may be provided to provide a multi-customer offer and/or to attempt to receive a sufficient quantity of requests to accept the multi-customer offer to satisfy a threshold quantity. Cloud computing environment 260 may provide computation, software, data access, storage, and/or other services that do not require end-user knowledge of a physical location and configuration of a system and/or a device that delivers the services. As shown, cloud computing environment 260 may include merchant platform 250 and computing resource 255.

Computing resource 255 includes one or more personal computers, workstation computers, server devices, or another type of computation and/or communication device. In some implementations, computing resource 255 may host merchant platform 250. The cloud resources may include compute instances executing in computing resource 255, storage devices provided in computing resource 255, data transfer devices provided by computing resource 255, and/or the like. In some implementations, computing resource 255 may communicate with other computing resources 255 via wired connections, wireless connections, or a combination of wired and wireless connections.

As further shown in FIG. 2, computing resource 255 may include a group of cloud resources, such as one or more applications ("APPs") 255-1, one or more virtual machines ("VMs") 255-2, virtualized storage ("VSs") 255-3, one or more hypervisors ("HYPs") 255-4, or the like.

Application 255-1 includes one or more software applications that may be provided to or accessed by customer device 210. Application 255-1 may eliminate a need to install and execute the software applications on customer device 210. For example, application 255-1 may include software associated with merchant platform 250 and/or any other software capable of being provided via cloud computing environment 260. In some implementations, one application 255-1 may send/receive information to/from one or more other applications 255-1, via virtual machine 255-2.

Virtual machine 255-2 includes a software implementation of a machine (e.g., a computer) that executes programs like a physical machine. Virtual machine 255-2 may be either a system virtual machine or a process virtual machine, depending upon use and degree of correspondence to any real machine by virtual machine 255-2. A system virtual machine may provide a complete system platform that supports execution of a complete operating system ("OS"). A process virtual machine may execute a single program and may support a single process. In some implementations, virtual machine 255-2 may execute on behalf of a user (e.g., customer device 210), and may manage infrastructure of cloud computing environment 260, such as data management, synchronization, or long-duration data transfers.

Virtualized storage 255-3 includes one or more storage systems and/or one or more devices that use virtualization techniques within the storage systems or devices of computing resource 255. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 255-4 provides hardware virtualization techniques that allow multiple operating systems (e.g., "guest operating systems") to execute concurrently on a host computer, such as computing resource 255. Hypervisor 255-4 may present a virtual operating platform to the "guest operating systems" and may manage the execution of the guest operating systems. Multiple instances of a variety of operating systems may share virtualized hardware resources.

Network 270 includes one or more wired and/or wireless networks. For example, network 270 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
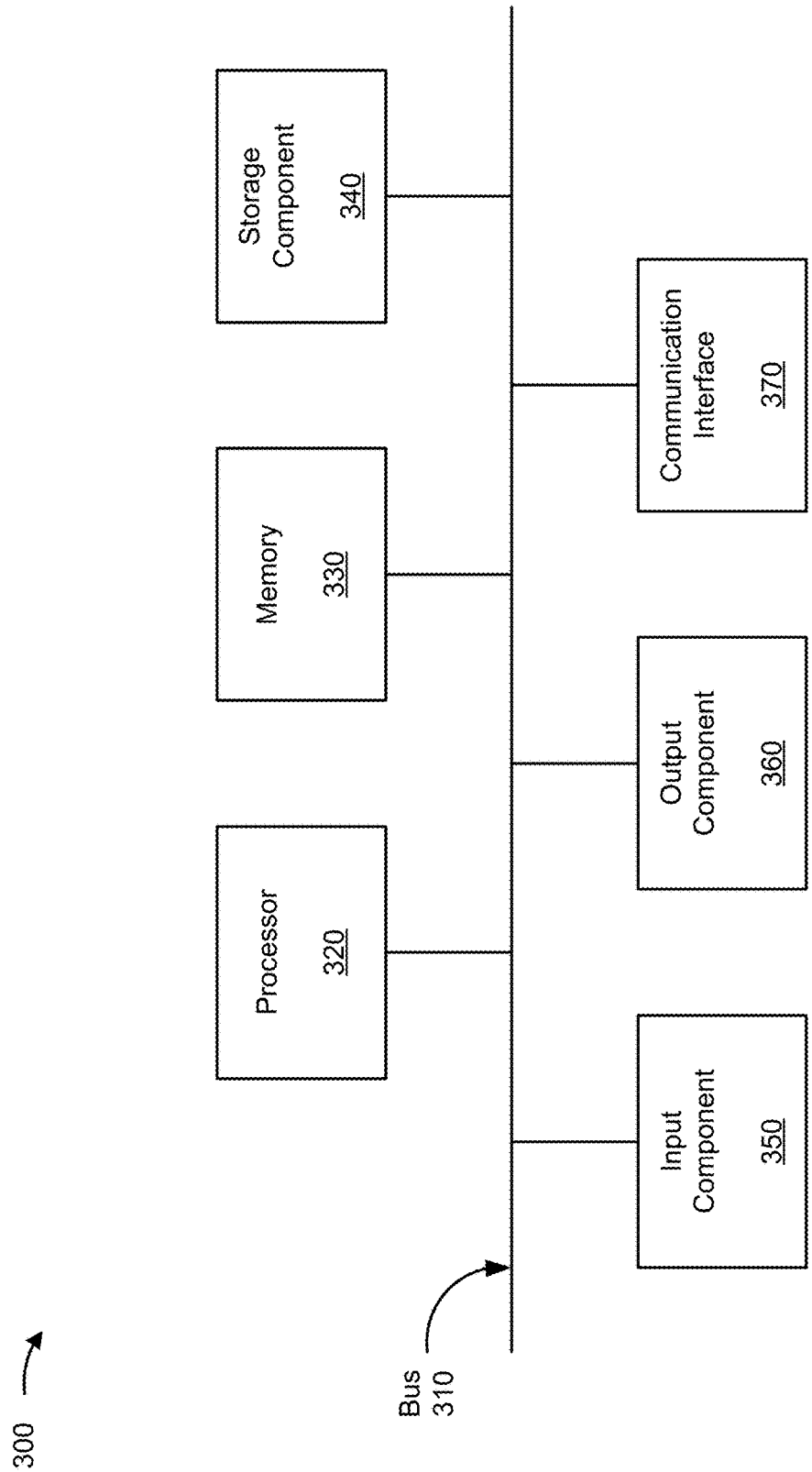
FIG. 3 is a diagram of example components of one or more devices of FIG. 2.

FIG. 3 is a diagram of example components of a device 300. Device 300 may correspond to customer device 210, candidate customer device 220, point of sale device 230, payment entity device 240, merchant platform 250, and/or computing resource 255. In some implementations, customer device 210, candidate customer device 220, point of sale device 230, payment entity device 240, merchant platform 250, and/or computing resource 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
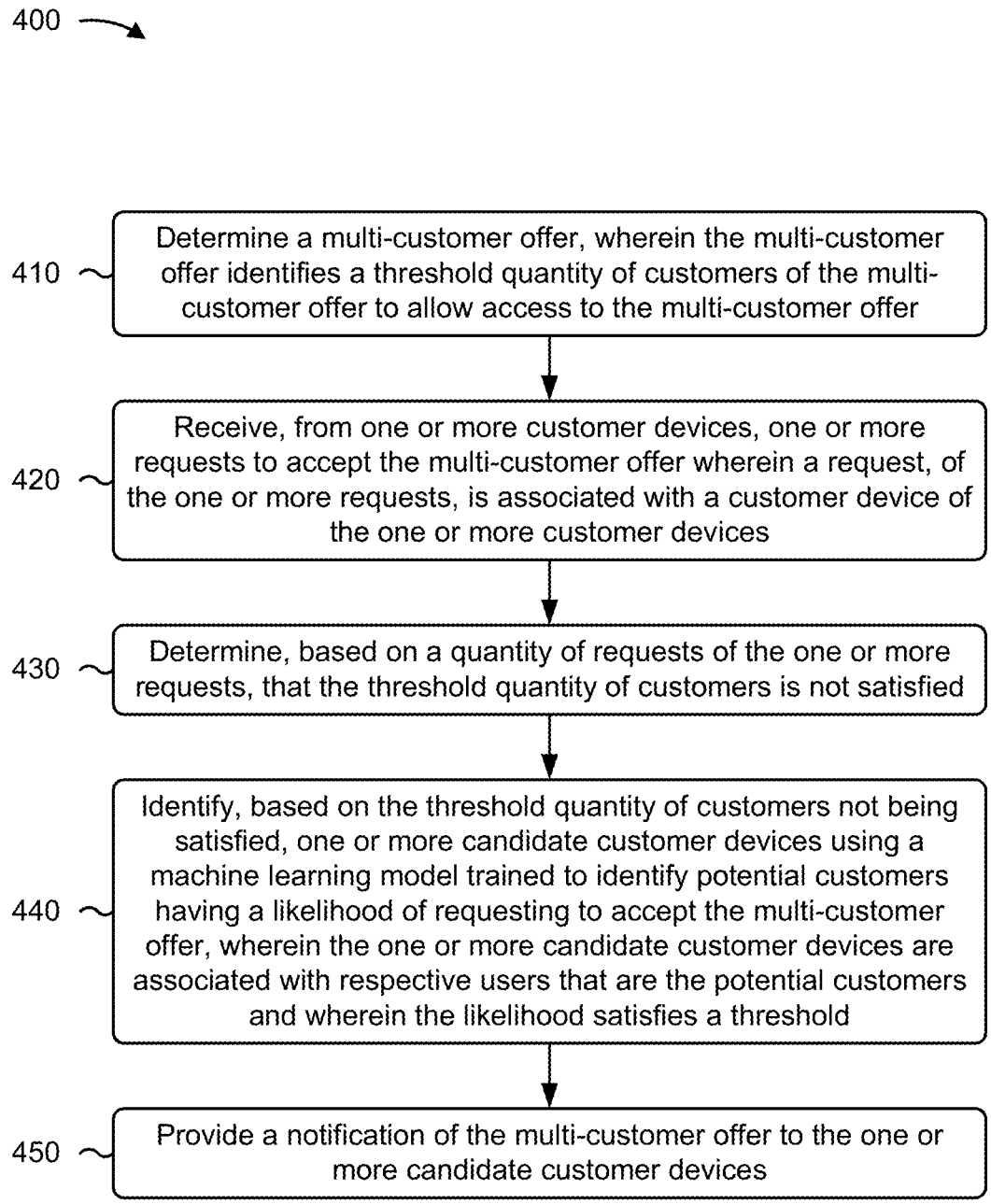
FIGS. 4-6 are flowcharts of example processes for providing a multi-customer offer.

FIG. 4 is a flow chart of an example process 400 for providing a multi-customer offer. In some implementations, one or more process blocks of FIG. 4 may be performed by a device (e.g., merchant platform 250). In some implementations, one or more process blocks of FIG. 4 may be performed by another device or a group of devices separate from or including the device, such as a customer device (e.g., customer device 210), a candidate customer device, (e.g., candidate customer device 220), a point of sale device (e.g., point of sale device 230), a payment entity device (e.g., payment entity device 240), and/or the like.

As shown in FIG. 4, process 400 may include determining a multi-customer offer, wherein the multi-customer offer identifies a threshold quantity of customers of the multi-customer offer to allow access to the multi-customer offer (block 410). For example, the device (e.g., using computing resource 255, processor 320, memory 330, storage component 340, input component 350, output component 360, communication interface 370 and/or the like) may determine a multi-customer offer, as described above. In some implementations, the multi-customer offer identifies a threshold quantity of customers of the multi-customer offer to allow access to the multi-customer offer.

As further shown in FIG. 4, process 400 may include receiving, from one or more customer devices, one or more requests to accept the multi-customer offer, wherein a request, of the one or more requests, is associated with a customer device of the one or more customer devices (block 420). For example, the device (e.g., using computing resource 255, processor 320, memory 330, storage component 340, input component 350, output component 360, communication interface 370 and/or the like) may receive, from one or more customer devices, one or more requests to accept the multi-customer offer, as described above. In some implementations, a request, of the one or more requests, is associated with a customer device of the one or more customer devices.

As further shown in FIG. 4, process 400 may include determining, based on a quantity of requests of the one or more requests, that the threshold quantity of customers is not satisfied (block 430). For example, the device (e.g., using computing resource 255, processor 320, memory 330, storage component 340, input component 350, output component 360, communication interface 370 and/or the like) may determine, based on a quantity of requests of the one or more requests, that the threshold quantity of customers is not satisfied, as described above.

As further shown in FIG. 4, process 400 may include identifying, based on the threshold quantity of customers not being satisfied, one or more candidate customer devices using a machine learning model trained to identify potential customers having a likelihood of requesting to accept the multi-customer offer, wherein the one or more candidate customer devices are associated with respective users that are the potential customers, and wherein the likelihood satisfies a threshold (block 440). For example, the device (e.g., using computing resource 255, processor 320, memory 330, storage component 340, input component 350, output component 360, communication interface 370 and/or the like) may identify, based on the threshold quantity of customers not being satisfied, one or more candidate customer devices using a machine learning model trained to identify potential customers having a likelihood of requesting to accept the multi-customer offer, as described above. In some implementations, the one or more candidate customer devices are associated with respective users that are the potential customers. In some implementations, the likelihood satisfies a threshold.

As further shown in FIG. 4, process 400 may include providing a notification of the multi-customer offer to the one or more candidate customer devices (block 450). For example, the device (e.g., using computing resource 255, processor 320, memory 330, storage component 340, input component 350, output component 360, communication interface 370 and/or the like) may provide a notification of the multi-customer offer to the one or more candidate customer devices, as described above.

Process 400 may include additional implementations, such as any single implementation or any combination of implementations described below and/or in connection with one or more other processes described elsewhere herein.

In a first implementation, process 400 further comprises: receiving, from the one or more candidate customer devices, one or more additional requests to accept the multi-customer offer; determining, based on receiving the one or more additional requests, that the threshold quantity of customers is satisfied; and providing access to the multi-customer offer based on the threshold quantity of customers being satisfied.

In a second implementation, alone or in combination with the first implementation, process 400 further comprises providing, to one or more additional customer devices, a notification indicating that access to the multi-customer offer is allowed.

In a third implementation, alone or in combination with one or more of the first and second implementations, process 400 further comprises: receiving payment information associated with the one or more requests to accept the multi-customer offer; receiving additional payment information associated with the one or more additional requests to accept the multi-customer offer; determining a payment defect in the payment information or the additional payment information; and performing one or more actions based on determining the payment defect.

In a fourth implementation, alone or in combination with one or more of the first through third implementations, performing the one or more actions based on determining the payment defect comprises: providing a notification of the payment defect to a customer device, of the one or more customer devices or the one or more candidate customer devices, associated with the payment defect; receiving, from the customer device associated with the payment defect, new payment information; and processing payments from one or more transactions accounts associated with the payment information or the new payment information.

In a fifth implementation, alone or in combination with one or more of the first through fourth implementations, the notification of the multi-customer offer comprises an indication of a difference between a quantity of the one or more requests to accept the multi-customer offer and the threshold quantity of customers of the multi-customer offer.

In a sixth implementation, alone or in combination with one or more of the first through fifth implementations, identifying the one or more candidate customer devices comprises one or more of: identifying the one or more candidate customer devices based on the one or more candidate customer devices being in proximity to a physical location associated with the merchant; identifying the one or more candidate customer devices based on the one or more candidate customer devices being associated with a customer device of the one or more customer devices; or identifying the one or more candidate customer devices based on the one or more candidate customer devices being associated with an application that is associated with the merchant.

In a seventh implementation, alone or in combination with one or more of the first through sixth implementations, process 400 further comprises receiving, from the one or more candidate customer devices prior to identifying the one or more candidate customer devices, an authorization to receive push notifications from the device, wherein identifying the one or more candidate customer devices comprises identifying the one or more candidate customer devices based on the authorization to receive push notifications from the device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
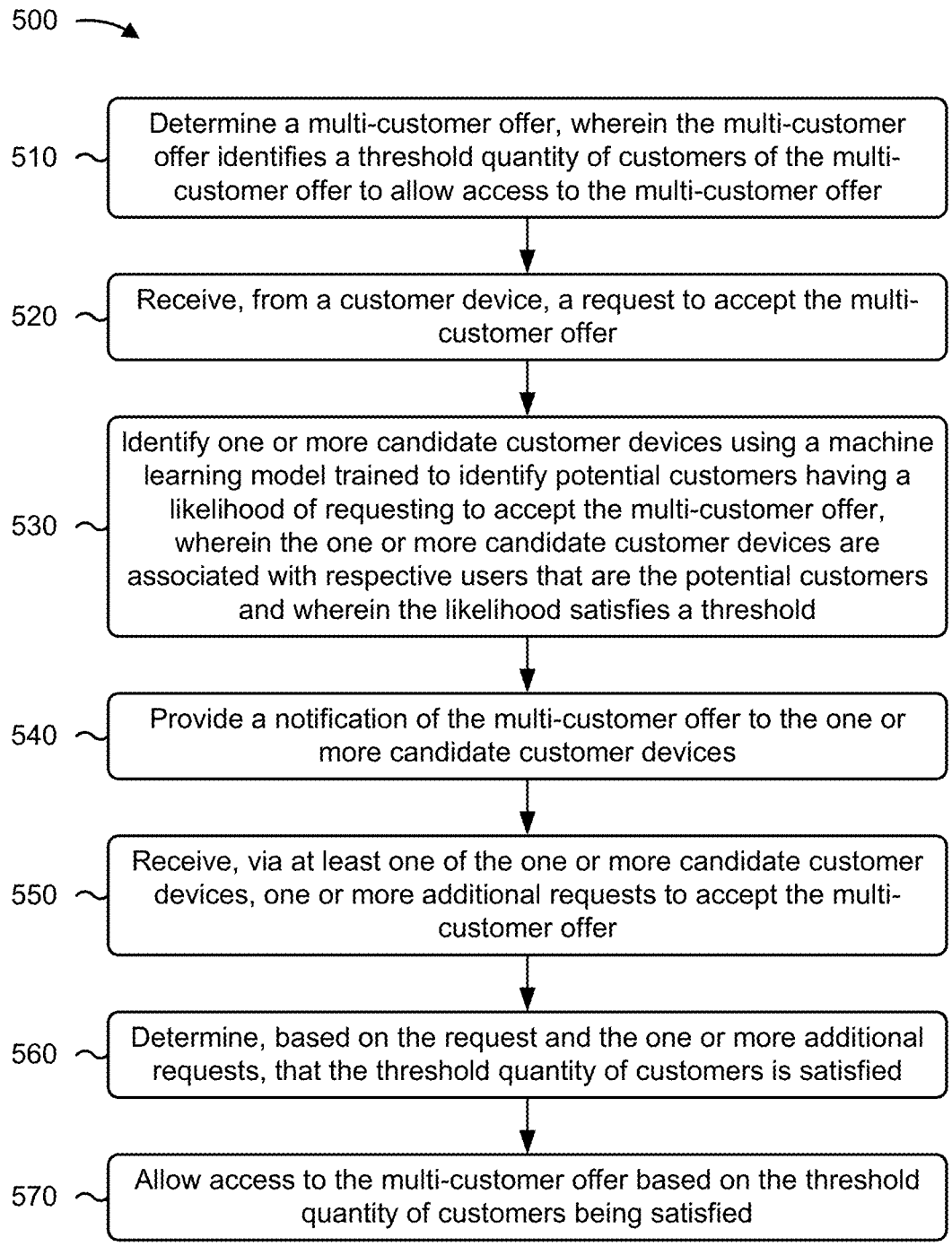

FIG. 5 is a flow chart of an example process 500 for providing a multi-customer offer. In some implementations, one or more process blocks of FIG. 5 may be performed by a device (e.g., merchant platform 250). In some implementations, one or more process blocks of FIG. 5 may be performed by another device or a group of devices separate from or including the device, such as a customer device (e.g., customer device 210), a candidate customer device, (e.g., candidate customer device 220), a point of sale device (e.g., point of sale device 230), a payment entity device (e.g., payment entity device 240), and/or the like.

As shown in FIG. 5, process 500 may include determining a multi-customer offer, wherein the multi-customer offer identifies a threshold quantity of customers of the multi-customer offer to allow access to the multi-customer offer (block 510). For example, the device (e.g., using computing resource 255, processor 320, memory 330, storage component 340, input component 350, output component 360, communication interface 370 and/or the like) may determine a multi-customer offer, as described above. In some implementations, the multi-customer offer identifies a threshold quantity of customers of the multi-customer offer to allow access to the multi-customer offer.

As further shown in FIG. 5, process 500 may include receiving, from a customer device, a request to accept the multi-customer offer (block 520). For example, the device (e.g., using computing resource 255, processor 320, memory 330, storage component 340, input component 350, output component 360, communication interface 370 and/or the like) may receive, from a customer device, a request to accept the multi-customer offer, as described above.

As further shown in FIG. 5, process 500 may include identifying one or more candidate customer devices using a machine learning model trained to identify potential customers having a likelihood of requesting to accept the multi-customer offer, wherein the one or more candidate customer devices are associated with respective users that are the potential customers and wherein the likelihood satisfies a threshold (block 530). For example, the device (e.g., using computing resource 255, processor 320, memory 330, storage component 340, input component 350, output component 360, communication interface 370 and/or the like) may identify one or more candidate customer devices using a machine learning model trained to identify potential customers having a likelihood of requesting to accept the multi-customer offer, as described above. In some implementations, the one or more candidate customer devices are associated with respective users that are the potential customers. In some implementations, the likelihood satisfies a threshold.

As further shown in FIG. 5, process 500 may include providing a notification of the multi-customer offer to the one or more candidate customer devices (block 540). For example, the device (e.g., using computing resource 255, processor 320, memory 330, storage component 340, input component 350, output component 360, communication interface 370 and/or the like) may provide a notification of the multi-customer offer to the one or more candidate customer devices, as described above.

As further shown in FIG. 5, process 500 may include receiving, via at least one of the one or more candidate customer devices, one or more additional requests to accept the multi-customer offer (block 550). For example, the device (e.g., using computing resource 255, processor 320, memory 330, storage component 340, input component 350, output component 360, communication interface 370 and/or the like) may receive, via at least one of the one or more candidate customer devices, one or more additional requests to accept the multi-customer offer, as described above.

As further shown in FIG. 5, process 500 may include determining, based on the request and the one or more additional requests, that the threshold quantity of customers is satisfied (block 560). For example, the device (e.g., using computing resource 255, processor 320, memory 330, storage component 340, input component 350, output component 360, communication interface 370 and/or the like) may determine, based on the request and the one or more additional requests, that the threshold quantity of customers is satisfied, as described above.

As further shown in FIG. 5, process 500 may include allowing access to the multi-customer offer based on the threshold quantity of customers being satisfied (block 570).

For example, the device (e.g., using computing resource 255, processor 320, memory 330, storage component 340, input component 350, output component 360, communication interface 370 and/or the like) may allow access to the multi-customer offer based on the threshold quantity of customers being satisfied, as described above.

Process 500 may include additional implementations, such as any single implementation or any combination of implementations described below and/or in connection with one or more other processes described elsewhere herein.

In a first implementation, the multi-customer offer is associated with a product or service, process 500 further comprises determining that the respective users associated with the one or more candidate customer devices have previously purchased the product or service, and, when identifying the one or more candidate customer devices, identifying the one or more candidate customer devices based on the determination that the respective users associated with the one or more candidate customer devices have previously purchased the product or service.

In a second implementation, alone or in combination with the first implementation, process 500 further comprises, when identifying the one or more candidate customer devices, identifying the one or more candidate customer devices based on an indication of a timing at which the respective users have previously purchased the product or service.

In a third implementation, alone or in combination with one or more of the first and second implementations, the notification of the multi-customer offer to the one or more candidate customer devices includes an identification of an incentive to accept the multi-customer offer.

In a fourth implementation, alone or in combination with one or more of the first through third implementations, the multi-customer offer identifies a dynamic discount for one or more of a product or a service, and an amount of the dynamic discount is based on a total quantity of the request and the one or more additional requests.

In a fifth implementation, alone or in combination with one or more of the first through fourth implementations, process 500 further comprises receiving the one or more additional requests via application programming interfaces of the one or more candidate customer devices.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
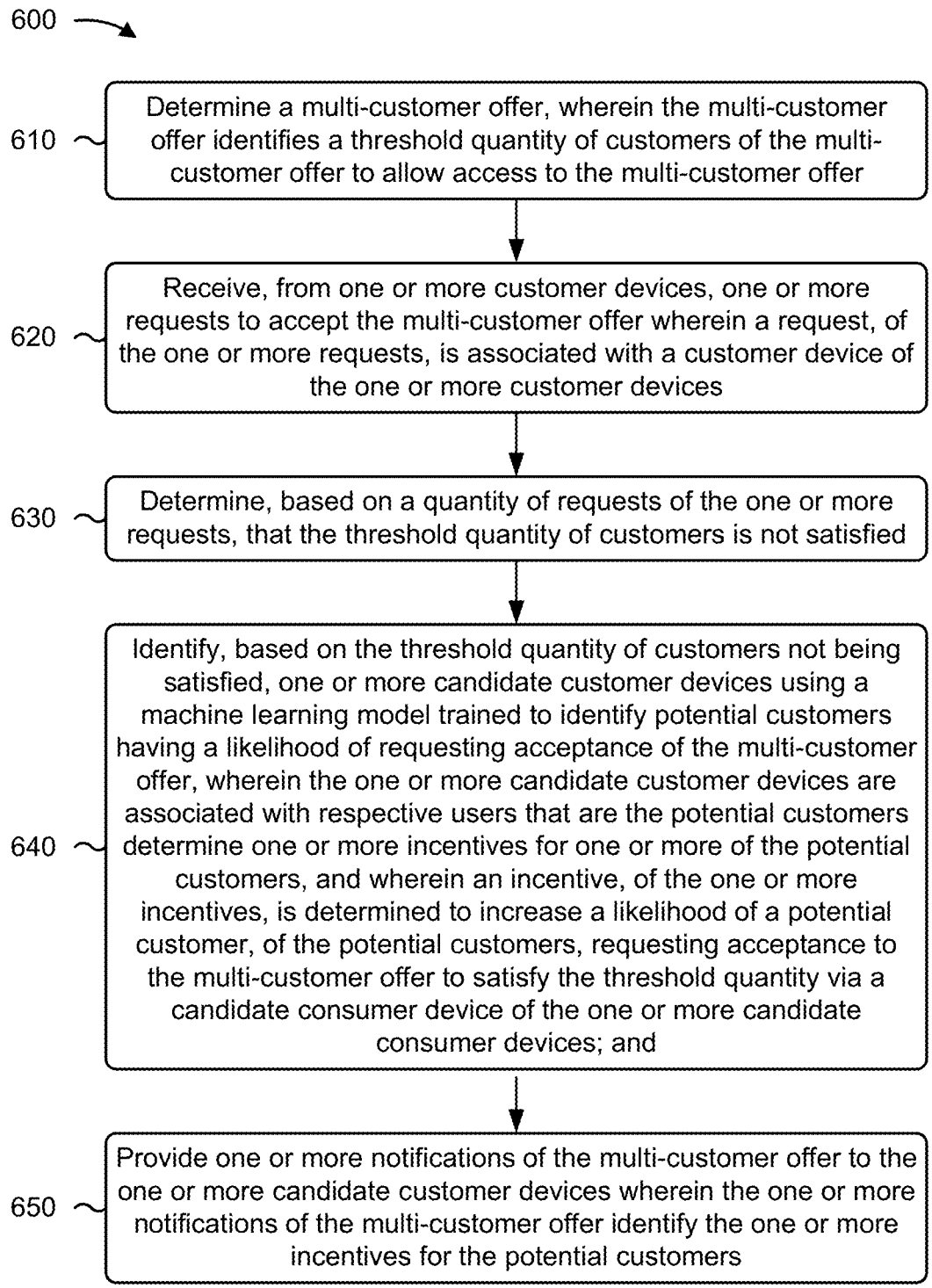

FIG. 6 is a flow chart of an example process 600 for providing a multi-customer offer. In some implementations, one or more process blocks of FIG. 6 may be performed by a device (e.g., merchant platform 250). In some implementations, one or more process blocks of FIG. 6 may be performed by another device or a group of devices separate from or including the device, such as a customer device (e.g., customer device 210), a candidate customer device, (e.g., candidate customer device 220), a point of sale device (e.g., point of sale device 230), a payment entity device (e.g., payment entity device 240), and/or the like.

As shown in FIG. 6, process 600 may include determining a multi-customer offer, wherein the multi-customer offer identifies a threshold quantity of customers of the multi-customer offer to allow access to the multi-customer offer (block 610). For example, the device (e.g., using computing resource 255, processor 320, memory 330, storage component 340, input component 350, output component 360, communication interface 370 and/or the like) may determine a multi-customer offer, as described above. In some implementations, the multi-customer offer identifies a threshold quantity of customers of the multi-customer offer to allow access to the multi-customer offer.

As further shown in FIG. 6, process 600 may include receiving, from one or more customer devices, one or more requests to accept the multi-customer offer wherein a request, of the one or more requests, is associated with a customer device of the one or more customer devices (block 620). For example, the device (e.g., using computing resource 255, processor 320, memory 330, storage component 340, input component 350, output component 360, communication interface 370 and/or the like) may receive, from one or more customer devices, one or more requests to accept the multi-customer offer, as described above. In some implementations, a request, of the one or more requests, is associated with a customer device of the one or more customer devices.

As further shown in FIG. 6, process 600 may include determining, based on a quantity of requests of the one or more requests, that the threshold quantity of customers is not satisfied (block 630). For example, the device (e.g., using computing resource 255, processor 320, memory 330, storage component 340, input component 350, output component 360, communication interface 370 and/or the like) may determine, based on a quantity of requests of the one or more requests, that the threshold quantity of customers is not satisfied, as described above.

As further shown in FIG. 6, process 600 may include identifying, based on the threshold quantity of customers not being satisfied, one or more candidate customer devices using a machine learning model trained to identify potential customers having a likelihood of requesting to accept of the multi-customer offer wherein the one or more candidate customer devices are associated with respective users that are the potential customers select one or more incentives for one or more of the potential customers and wherein an incentive, of the one or more incentives, is determined to increase a likelihood of a potential customer, of the potential customers, requesting to accept the multi-customer offer via a candidate customer device of the one or more candidate customer devices; and (block 640). For example, the device (e.g., using computing resource 255, processor 320, memory 330, storage component 340, input component 350, output component 360, communication interface 370 and/or the like) may identify, based on the threshold quantity of customers not being satisfied, one or more candidate customer devices using a machine learning model trained to identify potential customers having a likelihood of requesting to accept of the multi-customer offer, as described above. In some implementations, the one or more candidate customer devices are associated with respective users that are the potential customers. In some implementations, an incentive, of the one or more incentives, is determined to increase a likelihood of a potential customer, of the potential customers, requesting to accept the multi-customer offer via a candidate customer device of the one or more candidate customer devices.

As further shown in FIG. 6, process 600 may include providing one or more notifications of the multi-customer offer to the one or more candidate customer devices, wherein the one or more notifications of the multi-customer offer identify the one or more incentives for the potential customers (block 650). For example, the device (e.g., using computing resource 255, processor 320, memory 330, stor- age component 340, input component 350, output component 360, communication interface 370 and/or the like) may provide one or more notifications of the multi-customer offer to the one or more candidate customer devices, as described above. In some implementations, the one or more notifications of the multi-customer offer identify the one or more incentives for the potential customers.

Process 600 may include additional implementations, such as any single implementation or any combination of implementations described below and/or in connection with one or more other processes described elsewhere herein.

In a first implementation, process 600 further comprises determining the one or more incentives using a machine learning process, wherein the machine learning process includes training an incentives model based on historical outcomes of providing incentives to potential customers.

In a second implementation, alone or in combination with the first implementation, the respective users associated with the one or more candidate customer devices are also associated with a particular demographic, wherein the one or more incentives are determined to be effective, for the particular demographic relative to a general population, for increasing a likelihood of a potential customer, of the potential customers, requesting to accept the multi-customer offer, and wherein process 600 further comprises determining the one or more incentives based on the potential customers being associated with the particular demographic.

In a third implementation, alone or in combination with one or more of the first and second implementations, the respective users associated with the one or more candidate customer devices are associated with a particular demographic, potential customers within the particular demographic are determined to have an increased likelihood, relative to a general population, of requesting to accept the multi-customer offer based on a product or service associated with the multi-customer offer, and process 600 further comprises identifying the one or more candidate customer devices based on the respective users being within the particular demographic.

In a fourth implementation, alone or in combination with one or more of the first through third implementations, the respective users are associated with a same demographic as users that are associated with the one or more customer devices and process 600 further comprises identifying the one or more candidate customer devices based on the respective users being associated with the same demographic.

In a fifth implementation, alone or in combination with one or more of the first through fourth implementations, the multi-customer offer is associated with a product or service associated with a merchant and process 600 further comprises determining that the respective users associated with the one or more candidate customer devices have previously purchased the product or service or an associated product or service from a merchant that is different from the merchant associated with the product or service and identifying the one or more candidate customer devices based on the determination that the respective users associated with the one or more candidate customer devices have previously purchased the product or service or an associated product or service from a merchant that is different from the merchant associated with the product or service.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A method, comprising:
   determining, by a device associated with a merchant, a multi-customer offer,
      wherein the multi-customer offer identifies a threshold quantity of customers of the multi-customer offer to allow access to the multi-customer offer;

receiving, by the device and from one or more customer devices, one or more requests to accept the multi-customer offer,
   wherein a request, of the one or more requests, is associated with a customer device of the one or more customer devices;
determining, by the device and based on a quantity of requests of the one or more requests, that the threshold quantity of customers is not satisfied;
using, by the device, natural language processing to determine characteristics of the multi-customer offer;
identifying, by the device and based on the characteristics of the multi-customer offer and the threshold quantity of customers not being satisfied, one or more candidate customer devices using a candidate identification model trained to identify potential customers having a likelihood of requesting to accept the multi-customer offer,
   wherein the one or more candidate customer devices are associated with respective users that are the potential customers,
   wherein the potential customers are different from customers associated with the one or more customer devices,
   wherein the likelihood satisfies a threshold, and
   wherein using the candidate identification model uses natural language processing to determine characteristics of historical multi-customer offers,
      wherein the characteristics of historical multi-customer offers include:
         characteristics of a plurality of historical customer devices, and
         characteristics of a plurality of historical associated users, and
      wherein using the candidate identification model includes classifying, by the device, relationships among the characteristics of the plurality of historical customer devices and the characteristics of the plurality of historical associated users;
training, by the device, the candidate identification model with information identifying the one or more candidate customer devices and the characteristics of the multi-customer offer,
   wherein training the candidate identification model comprises:
      performing dimensionality reduction to reduce the information identifying the one or more candidate customer devices and the characteristics of the multi-customer offer to a minimum feature set, and
      training the candidate identification model based on the minimum feature set; and
providing, by the device, a notification of another multi-customer offer to the one or more candidate customer devices identified by the trained candidate identification model.

2. The method of claim 1, further comprising:
receiving, from the one or more candidate customer devices, one or more additional requests to accept the multi-customer offer;
determining, based on receiving the one or more additional requests, that the threshold quantity of customers is satisfied; and
providing access to the multi-customer offer based on the threshold quantity of customers being satisfied.

3. The method of claim 2, further comprising:
providing, to one or more additional customer devices, a notification indicating that access to the multi-customer offer is allowed.

4. The method of claim 2, further comprising:
receiving payment information associated with the one or more requests to accept the multi-customer offer;
receiving additional payment information associated with the one or more additional requests to accept the multi-customer offer;
determining a payment defect in the payment information or the additional payment information; and
performing one or more actions based on determining the payment defect in the payment information.

5. The method of claim 4, wherein performing the one or more actions based on determining the payment defect comprises:
providing a notification of the payment defect to a customer device, of the one or more customer devices or the one or more candidate customer devices, associated with the payment defect;
receiving, from the customer device associated with the payment defect, new payment information; and
processing payments from one or more transactions accounts associated with the payment information or the new payment information.

6. The method of claim 1, wherein the notification of the multi-customer offer comprises an indication of a difference between a quantity of the one or more requests to accept the multi-customer offer and the threshold quantity of customers of the multi-customer offer.

7. The method of claim 1, wherein identifying the one or more candidate customer devices comprises one or more of:
identifying the one or more candidate customer devices based on the one or more candidate customer devices being in proximity to a physical location associated with the merchant;
identifying the one or more candidate customer devices based on the one or more candidate customer devices being associated with the customer device of the one or more customer devices; or
identifying the one or more candidate customer devices based on the one or more candidate customer devices being associated with an application that is associated with the merchant.

8. The method of claim 1, further comprising receiving, from the one or more candidate customer devices prior to identifying the one or more candidate customer devices, an authorization to receive push notifications from the device,
wherein identifying the one or more candidate customer devices comprises identifying the one or more candidate customer devices based on the authorization to receive push notifications from the device.

9. A device, comprising:
one or more memories; and
one or more processors, communicatively coupled to the one or more memories, configured to:
   determine a multi-customer offer,
      wherein the multi-customer offer identifies a threshold quantity of customers of the multi-customer offer to allow access to the multi-customer offer;
   identify characteristics of the multi-customer offer using natural language processing;
   receive, from a customer device, a request to accept the multi-customer offer;
   identify, based on the characteristics of the multi-customer offer, one or more candidate customer devices using a machine learning model trained to identify potential customers having a likelihood of requesting to accept the multi-customer offer,
wherein the one or more candidate customer devices are associated with respective users that are the potential customers,
wherein the one or more candidate customer devices are different from the customer device,
wherein the likelihood satisfies a threshold, and
wherein using the candidate identification model uses natural language processing to determine characteristics of historical multi-customer offers,
wherein the characteristics of historical multi-customer offers include:
characteristics of a plurality of historical customer devices, and
characteristics of a plurality of historical associated users, and
wherein using the candidate identification model includes classifying relationships among the characteristics of the plurality of historical customer devices and the characteristics of the plurality of historical associated users;
train the candidate identification model with information identifying the one or more candidate customer devices and the characteristics of the multi-customer offer,
wherein the one or more processors, when training the candidate identification model, are configured to:
perform an artificial neural network processing technique to perform pattern recognition with regard to patterns of whether the characteristics of the multi-customer offer correspond to whether a particular customer device has a threshold likelihood of requesting to accept a particular multi-customer offer, and
train the candidate identification model based the patterns;
provide a notification of another multi-customer offer to the one or more candidate customer devices identified by the trained candidate identification model;
receive, via at least one of the one or more candidate customer devices, one or more additional requests to accept the multi-customer offer;
determine, based on the request and the one or more additional requests, that the threshold quantity of customers is satisfied; and
allow access to the multi-customer offer based on the threshold quantity of customers being satisfied.

10. The device of claim 9, wherein the multi-customer offer is associated with a product or service,
wherein the one or more processors are further configured to determine that the respective users associated with the one or more candidate customer devices have previously purchased the product or service, and
wherein the one or more processors, when identifying the one or more candidate customer devices, are configured to identify the one or more candidate customer devices based on the determination that the respective users associated with the one or more candidate customer devices have previously purchased the product or service.

11. The device of claim 10, wherein the one or more processors, when identifying the one or more candidate customer devices, are configured to identify the one or more candidate customer devices based on an indication of a timing at which the respective users have previously purchased the product or service.

12. The device of claim 9, wherein the notification of the multi-customer offer to the one or more candidate customer devices includes an identification of an incentive to accept the multi-customer offer.

13. The device of claim 9, wherein the multi-customer offer identifies a dynamic discount for one or more of a product or a service; and
wherein an amount of the dynamic discount is based on a total quantity of the request and the one or more additional requests.

14. The device of claim 9, wherein the one or more processors are configured to receive the one or more additional requests via application programming interfaces of the one or more candidate customer devices.

15. A non-transitory computer-readable medium storing instructions, the instructions comprising:
one or more instructions that, when executed by one or more processors, cause the one or more processors to:
determine a multi-customer offer,
wherein the multi-customer offer identifies a threshold quantity of customers of the multi-customer offer to allow access to the multi-customer offer;
identify characteristics of the multi-customer offer using natural language processing;
receive, from one or more customer devices, one or more requests to accept the multi-customer offer,
wherein a request, of the one or more requests, is associated with a customer device of the one or more customer devices;
determine, based on a quantity of requests of the one or more requests, that the threshold quantity of customers is not satisfied;
identify, based on the threshold quantity of customers not being satisfied and the characteristics of the multi-customer offer, one or more candidate customer devices using a candidate identification model trained to identify potential customers having a likelihood of requesting to accept of the multi-customer offer,
wherein the one or more candidate customer devices are associated with respective users that are the potential customers,
wherein the one or more candidate customer devices are different from the one or more customer devices,
wherein using the candidate identification model uses natural language processing to determine characteristics of historical multi-customer offers,
wherein the characteristics of historical multi-customer offers include:
characteristics of a plurality of historical customer devices, and
characteristics of a plurality of historical associated users, and
wherein using the candidate identification model includes classifying relationships among the characteristics of the historical multi-customer offers, the characteristics of the historical customer devices, and the characteristics of the plurality of the historical associated users;
select one or more incentives for one or more of the potential customers;
wherein an incentive, of the one or more incentives, is determined to increase a likelihood of a potential customer, of the potential customers, requesting to accept the multi-customer offer via a candidate customer device of the one or more candidate customer devices;

train the candidate identification model with information identifying the one or more candidate customer devices and the characteristics of the multi-customer offer,
- wherein the one or more processors, when training the candidate identification model, are configured to:
  - portion the information identifying the one or more candidate customer devices and the characteristics of the multi-customer offer into a training set, a validation set, and a test set, and
  - train the candidate identification model based on the test set; and provide one or more notifications of another multi-customer offer to the one or more candidate customer devices, identified by the trained candidate identification model,
- wherein the one or more notifications of the multi-customer offer identify the one or more incentives for the potential customers.

16. The non-transitory computer-readable medium of claim 15, wherein the one or more instructions, when executed by the one or more processors, further cause the one or more processors to determine the one or more incentives using a machine learning process,
- wherein the machine learning process includes training an incentives model based on historical outcomes of providing incentives to potential customers.

17. The non-transitory computer-readable medium of claim 15, wherein the respective users associated with the one or more candidate customer devices are also associated with a particular demographic,
- wherein the one or more incentives are determined to be effective, for the particular demographic relative to a general population, for increasing a likelihood of a potential customer, of the potential customers, requesting to accept the multi-customer offer, and
- wherein the one or more instructions, when executed by the one or more processors, further cause the one or more processors to determine the one or more incentives based on the potential customers being associated with the particular demographic.

18. The non-transitory computer-readable medium of claim 15, wherein the respective users associated with the one or more candidate customer devices are associated with a particular demographic,
- wherein potential customers within the particular demographic are determined to have an increased likelihood, relative to a general population, of requesting to accept the multi-customer offer based on a product or service associated with the multi-customer offer, and
- wherein the one or more instructions, when executed by the one or more processors, further cause the one or more processors to identify the one or more candidate customer devices based on the respective users being within the particular demographic.

19. The non-transitory computer-readable medium of claim 15, wherein the respective users are associated with a same demographic as users that are associated with the one or more customer devices, and
- wherein the one or more instructions, when executed by the one or more processors, further cause the one or more processors to identify the one or more candidate customer devices based on the respective users being associated with the same demographic.

20. The non-transitory computer-readable medium of claim 15, wherein the multi-customer offer is associated with a product or service associated with a merchant,
- wherein the one or more instructions, when executed by the one or more processors, further cause the one or more processors to determine that the respective users associated with the one or more candidate customer devices have previously purchased the product or service or an associated product or service from a merchant that is different from the merchant associated with the product or service, and
- wherein the one or more instructions, when executed by the one or more processors, further cause the one or more processors to identify the one or more candidate customer devices based on the determination that the respective users associated with the one or more candidate customer devices have previously purchased the product or service or an associated product or service from a merchant that is different from the merchant associated with the product or service.

* * * * *